(12) United States Patent  
Chauvin et al.

(10) Patent No.: US 8,177,295 B2
(45) Date of Patent: May 15, 2012

(54) DUAL PANEL SUNROOF

(75) Inventors: Kevin Chauvin, Ann Arbor, MI (US);
Yoji Nagashima, West Bloomfield, MI (US); Nobuhiro Mizoguchi, Northville, MI (US)

(73) Assignee: Aisin Technical Center of America, Inc., Pymouth, MI (US)

( * ) Notice: Subject to any disclaimer, the term of this patent is extended or adjusted under 35 U.S.C. 154(b) by 0 days.

(21) Appl. No.: 12/727,682

(22) Filed: Mar. 19, 2010

(65) Prior Publication Data
US 2011/0121615 A1    May 26, 2011

Related U.S. Application Data

(60) Provisional application No. 61/263,044, filed on Nov. 20, 2009.

(51) Int. Cl.
*B60J 7/047* (2006.01)

(52) U.S. Cl. .................... 296/220.01; 296/222

(58) Field of Classification Search ............ 296/224, 296/216.03–216.05, 220.01, 222
See application file for complete search history.

(56) References Cited

U.S. PATENT DOCUMENTS

| 4,877,285 | A | * | 10/1989 | Huyer ................ 296/216.03 |
| 5,197,779 | A | | 3/1993 | Mizuno et al. |
| 5,527,085 | A | | 6/1996 | Ochiai et al. |
| 6,419,308 | B1 | | 7/2002 | Corder et al. |
| 6,502,898 | B1 | * | 1/2003 | Salz .................... 296/220.01 |
| 6,527,337 | B2 | * | 3/2003 | Farber .................... 296/222 |
| 7,222,908 | B1 | | 5/2007 | Cho |
| 2001/0019218 | A1 | | 9/2001 | Lee et al. |
| 2009/0039682 | A1 | | 2/2009 | Ito et al. |
| 2009/0072589 | A1 | | 3/2009 | Ito et al. |

FOREIGN PATENT DOCUMENTS

JP      2002-103977       4/2002

OTHER PUBLICATIONS

International Search Report and Written Opinion issued Jan. 25, 2011, in PCT/US 10/57384 filed Nov. 19, 2010.

* cited by examiner

*Primary Examiner* — Dennis Pedder
(74) *Attorney, Agent, or Firm* — Oblon, Spivak, McClelland, Maier & Neustadt, L.L.P.

(57) ABSTRACT

A dual panel sunroof is provided. The sunroof includes a front glass guide that supports a front glass panel and a rear glass guide that supports a rear glass panel. The rear glass panel is disposed rearward of the front glass panel when the dual panel sunroof is in a fully closed position. A front link is rotatably mounted to a front portion of the front glass guide such that the front link drives a front end of the front glass in an upward direction away from a vehicle body when the front link is driven in a rearward direction.

9 Claims, 23 Drawing Sheets

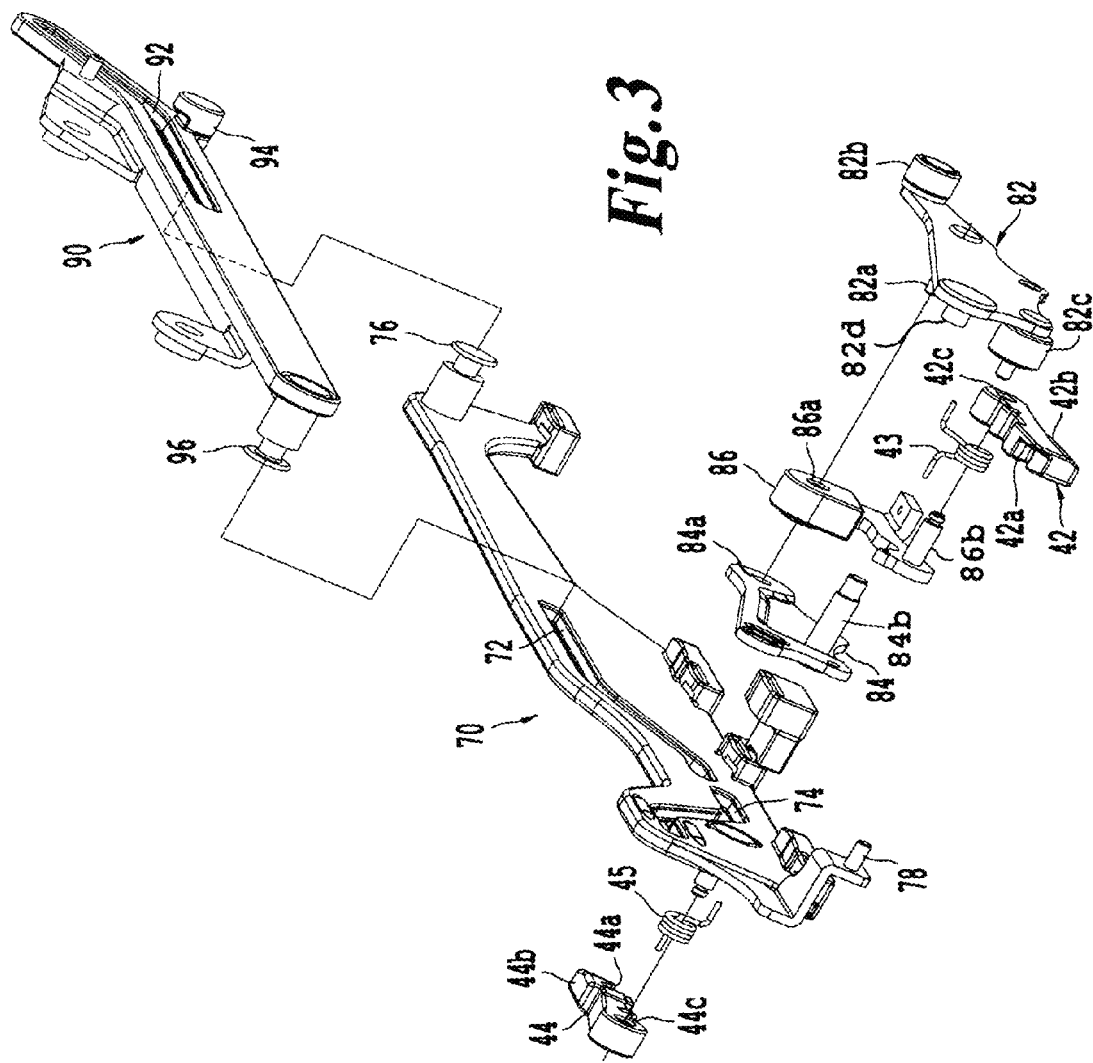

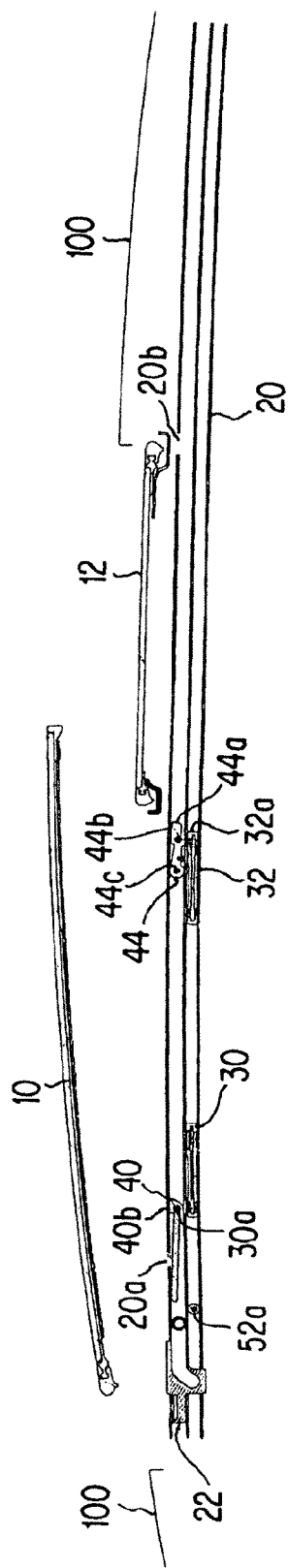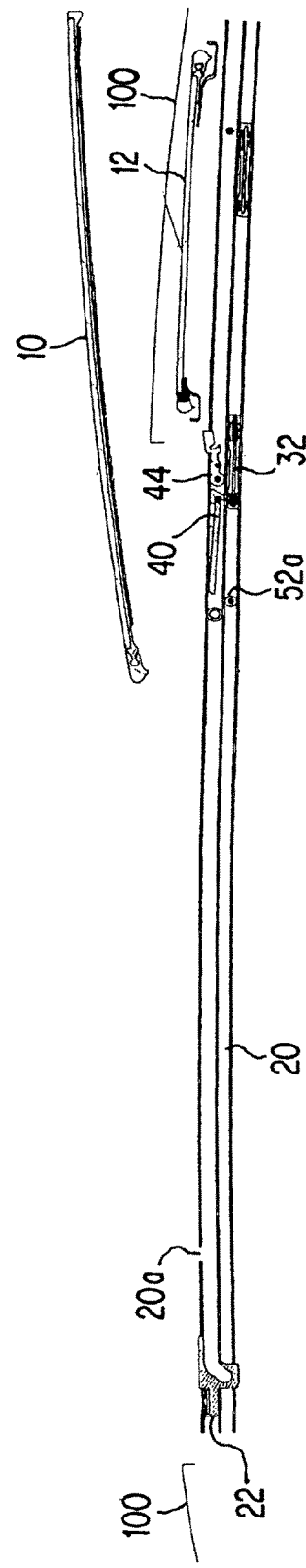

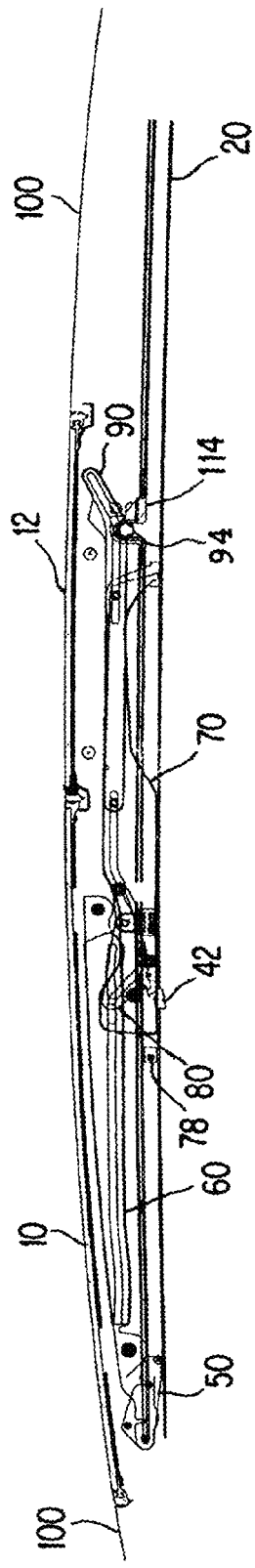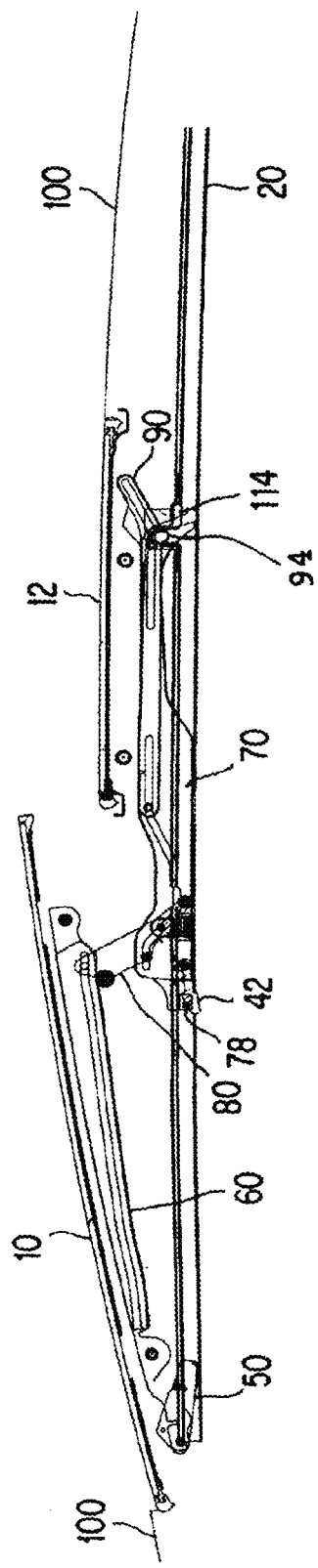

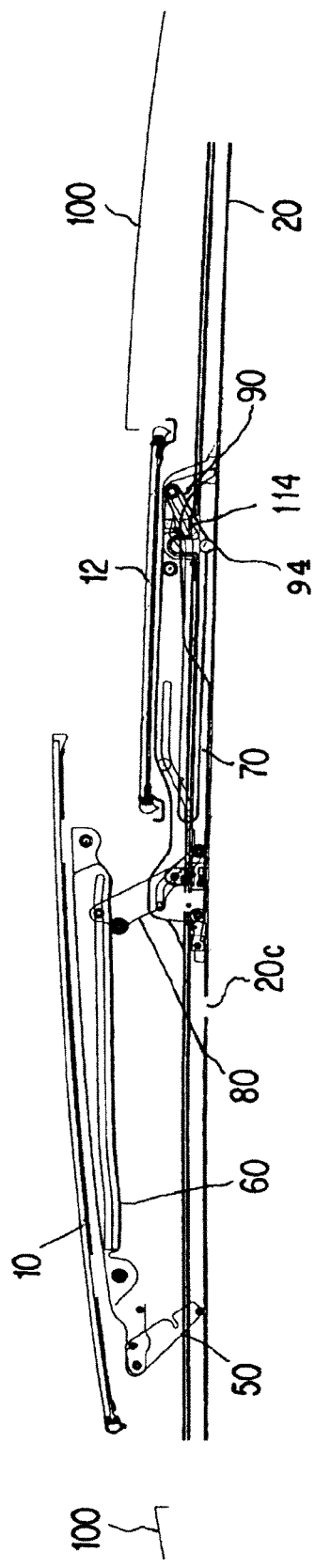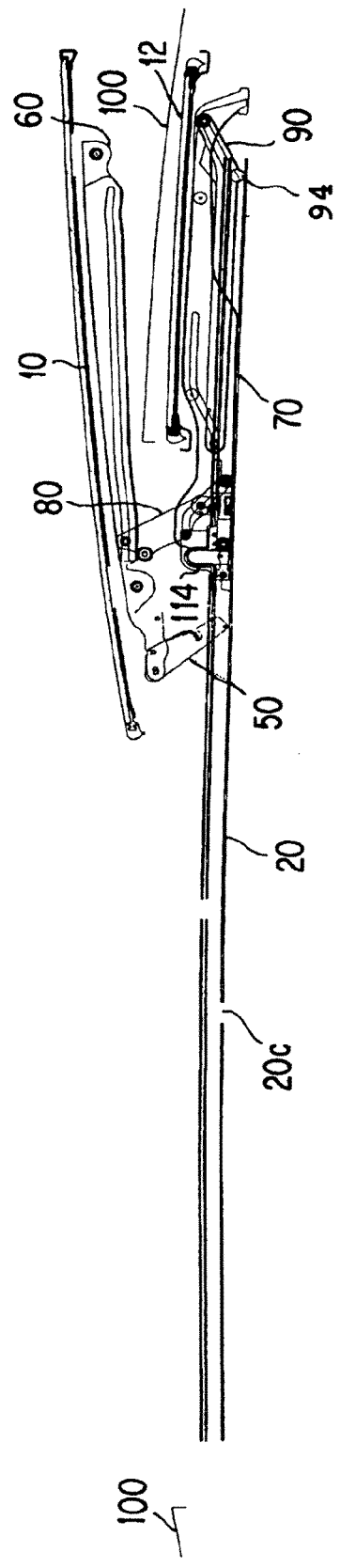

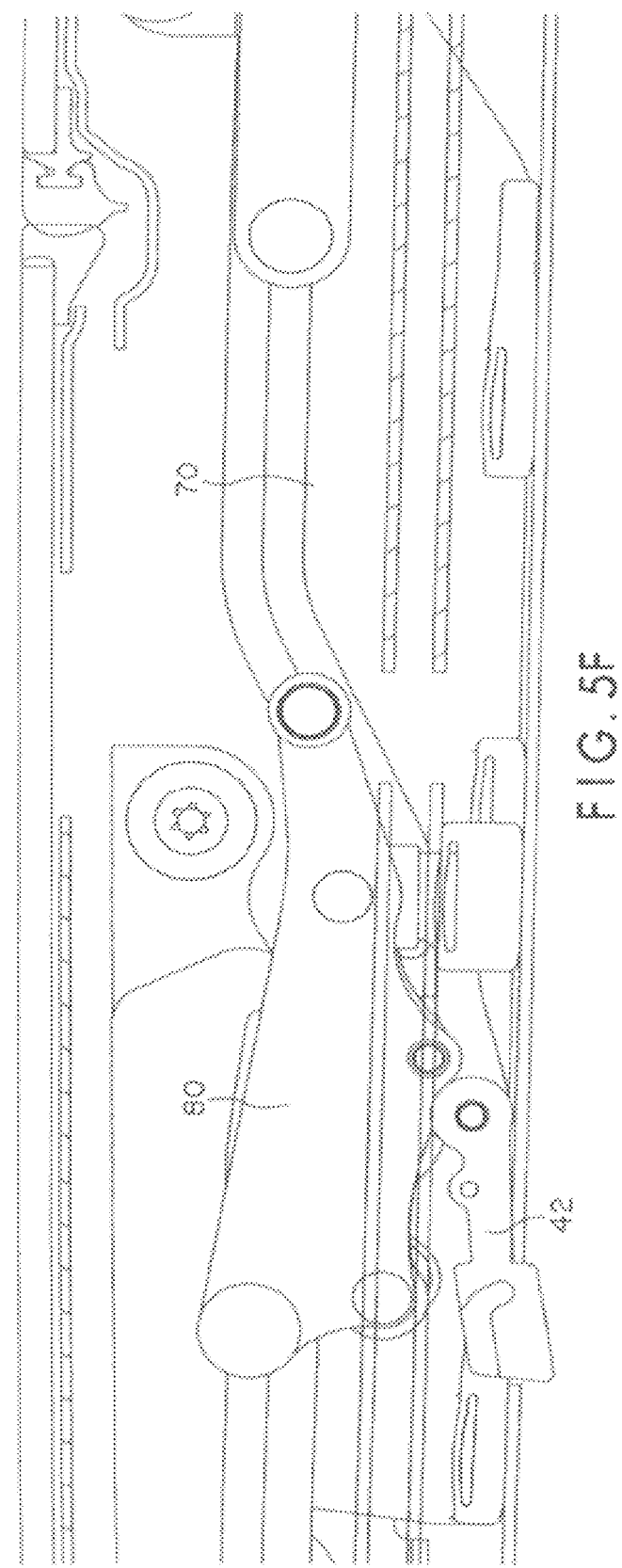

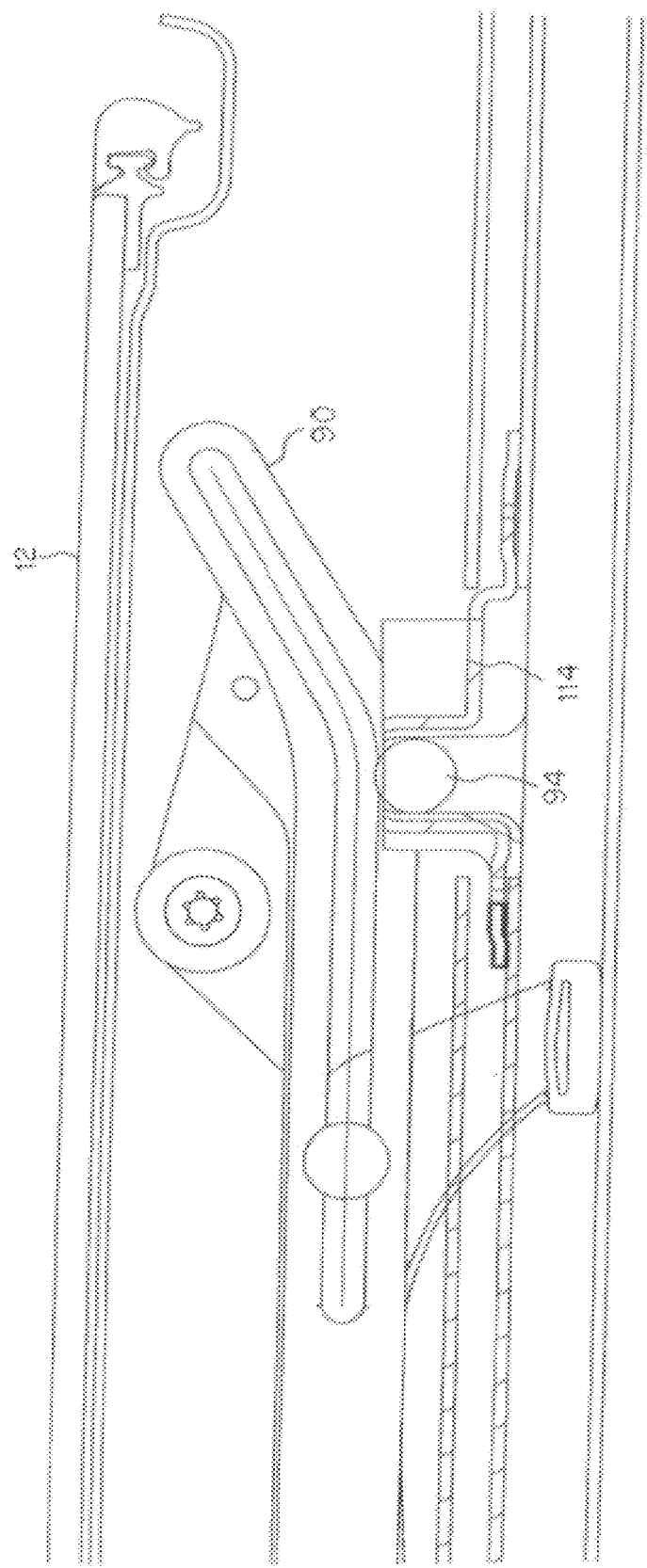

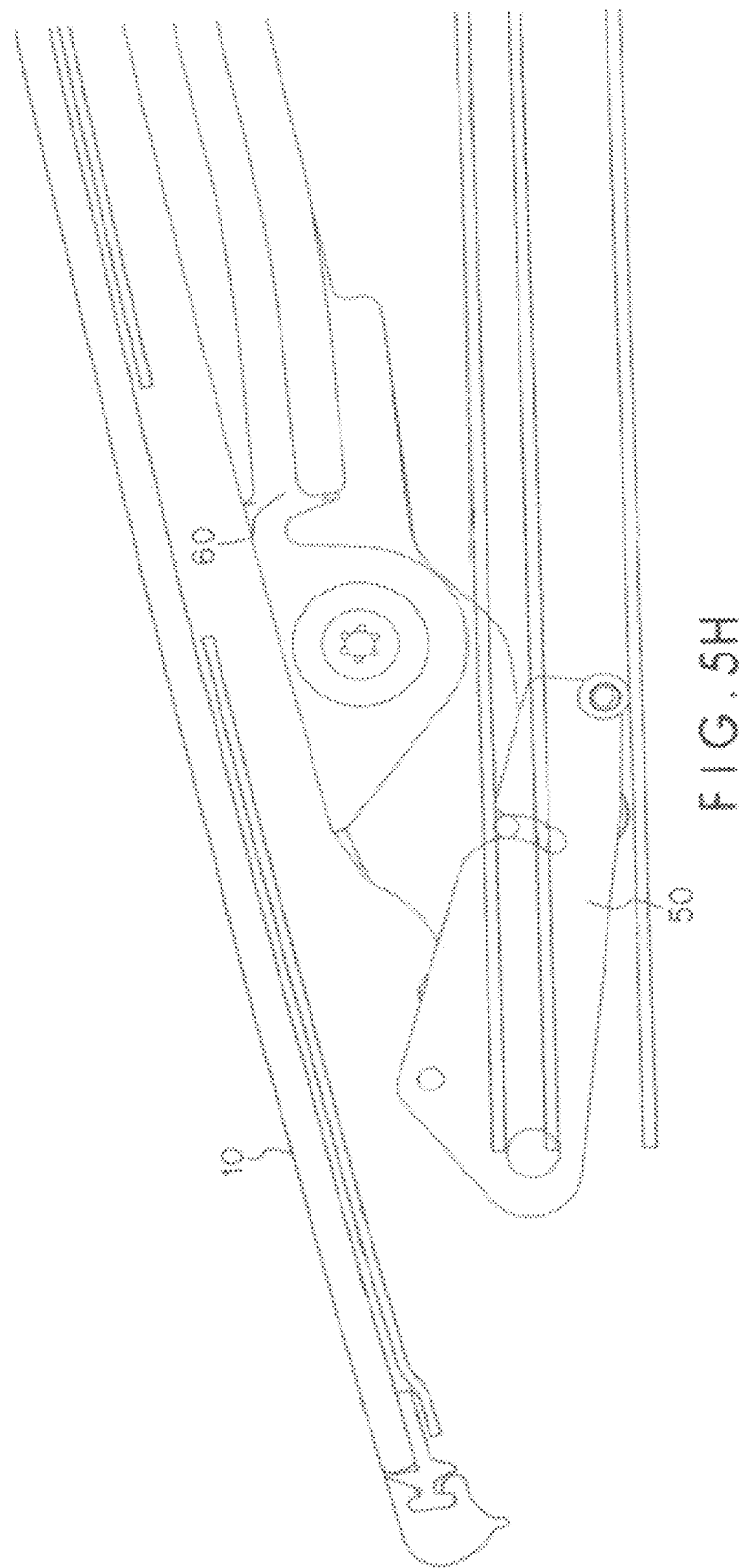

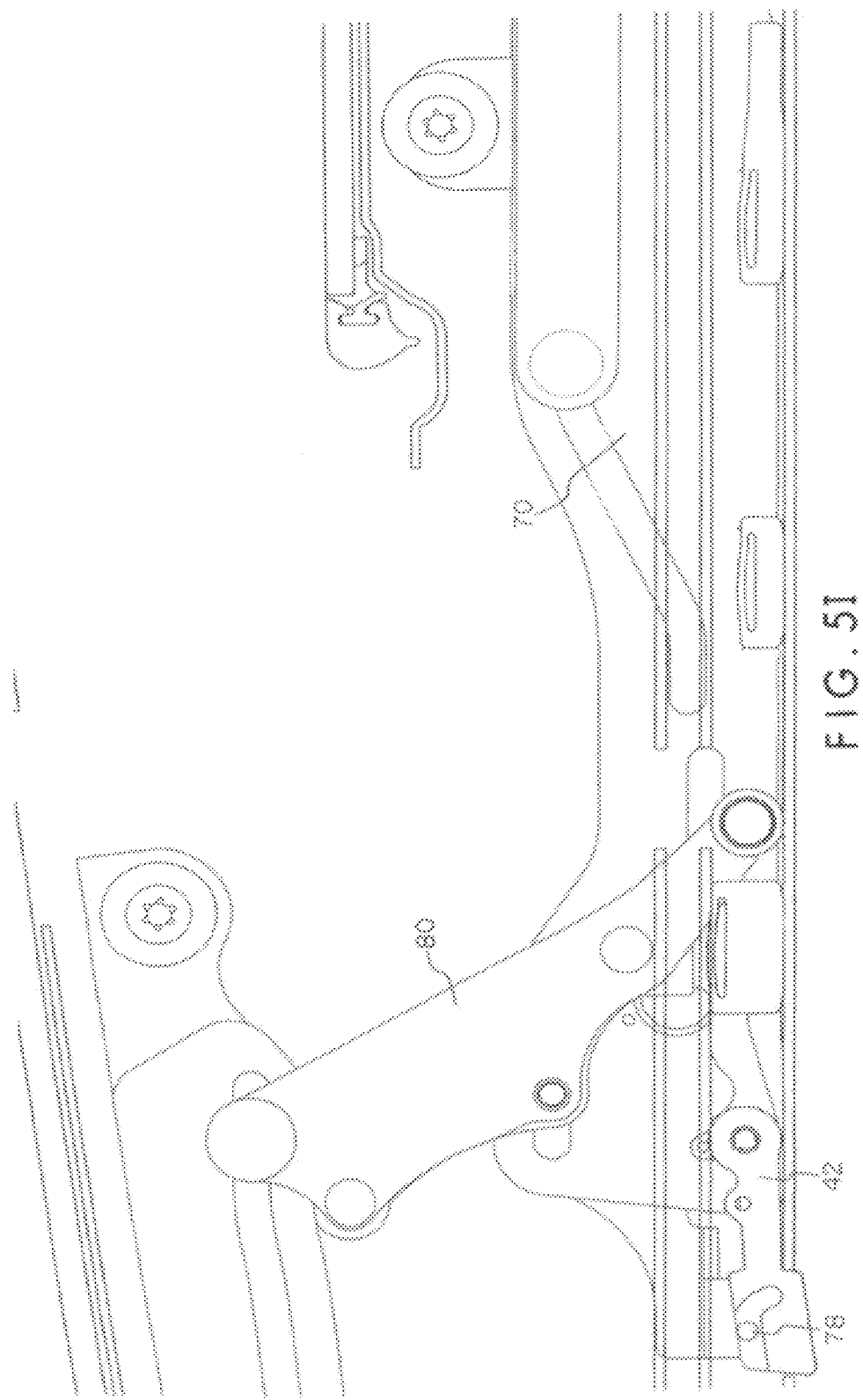

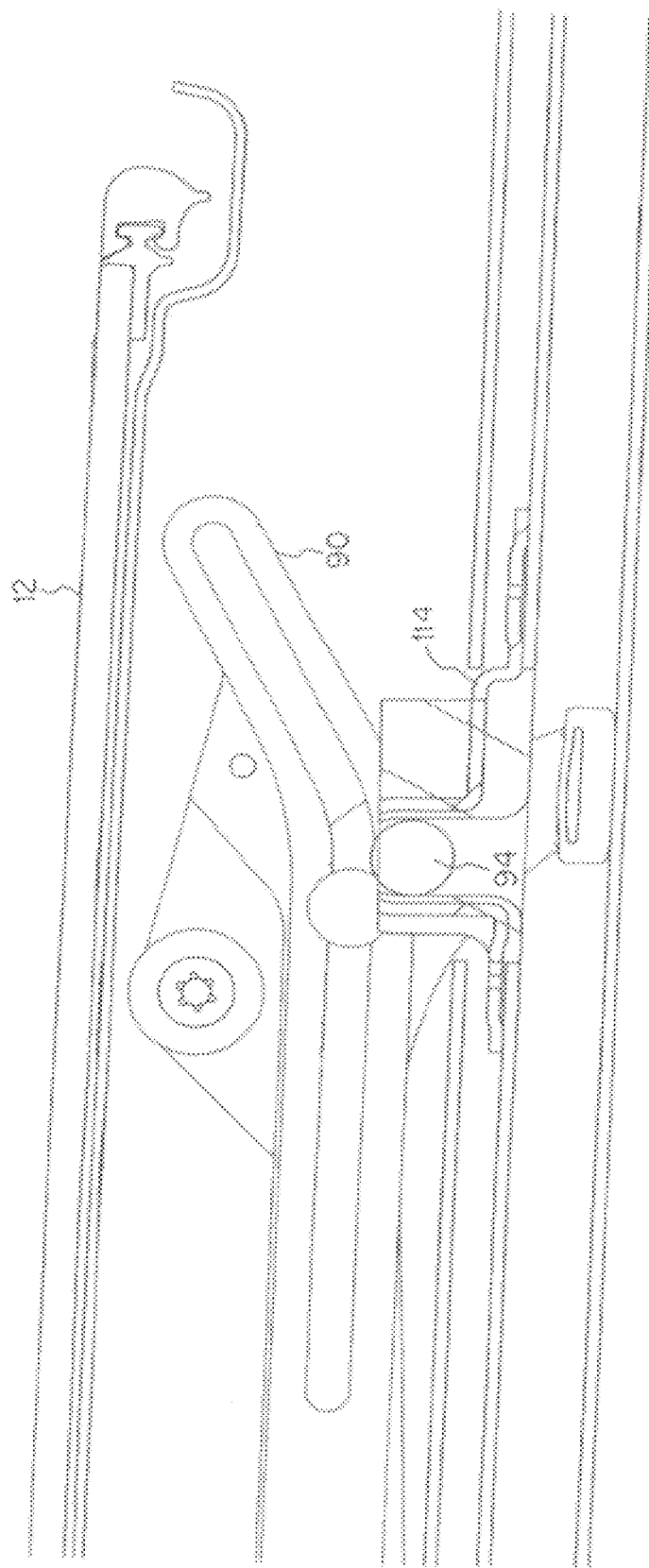

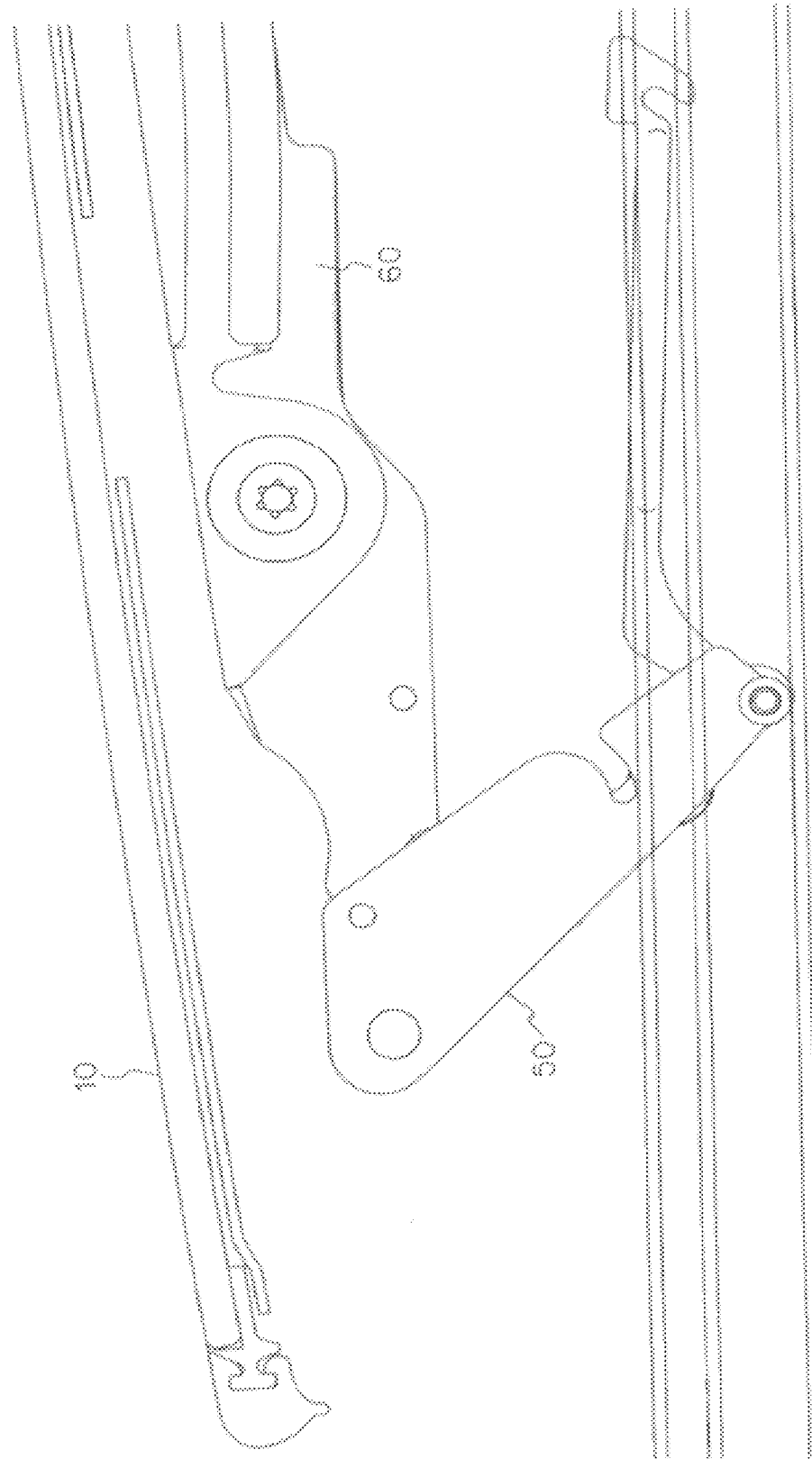

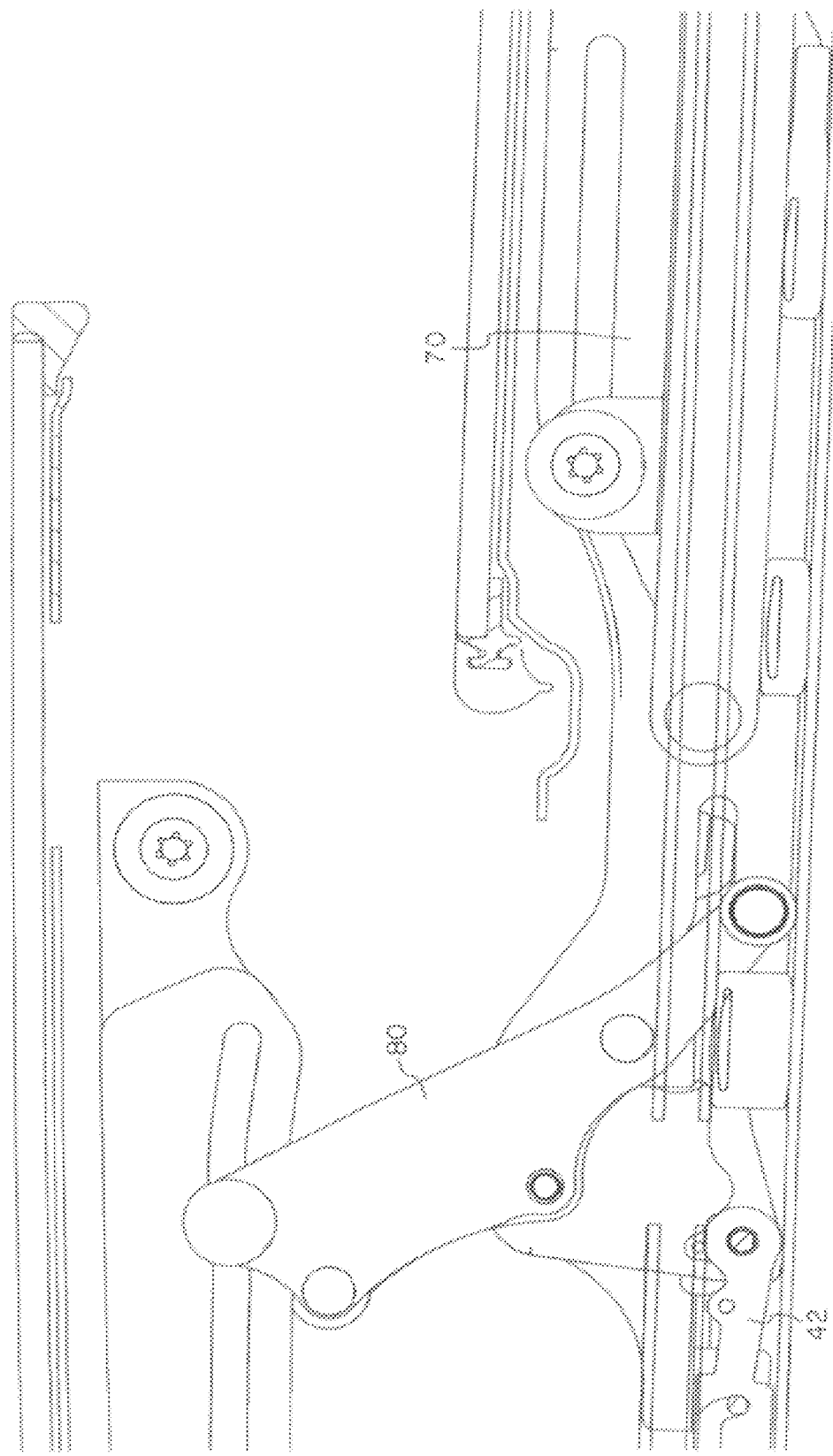

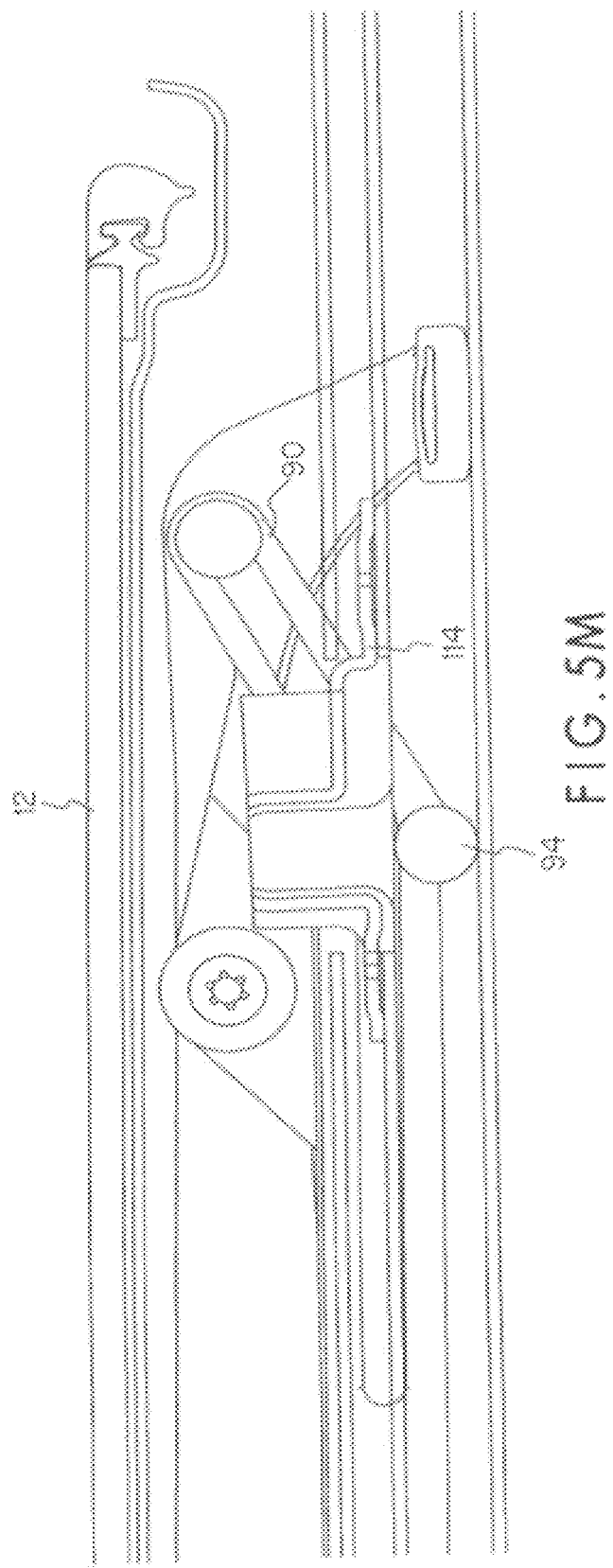

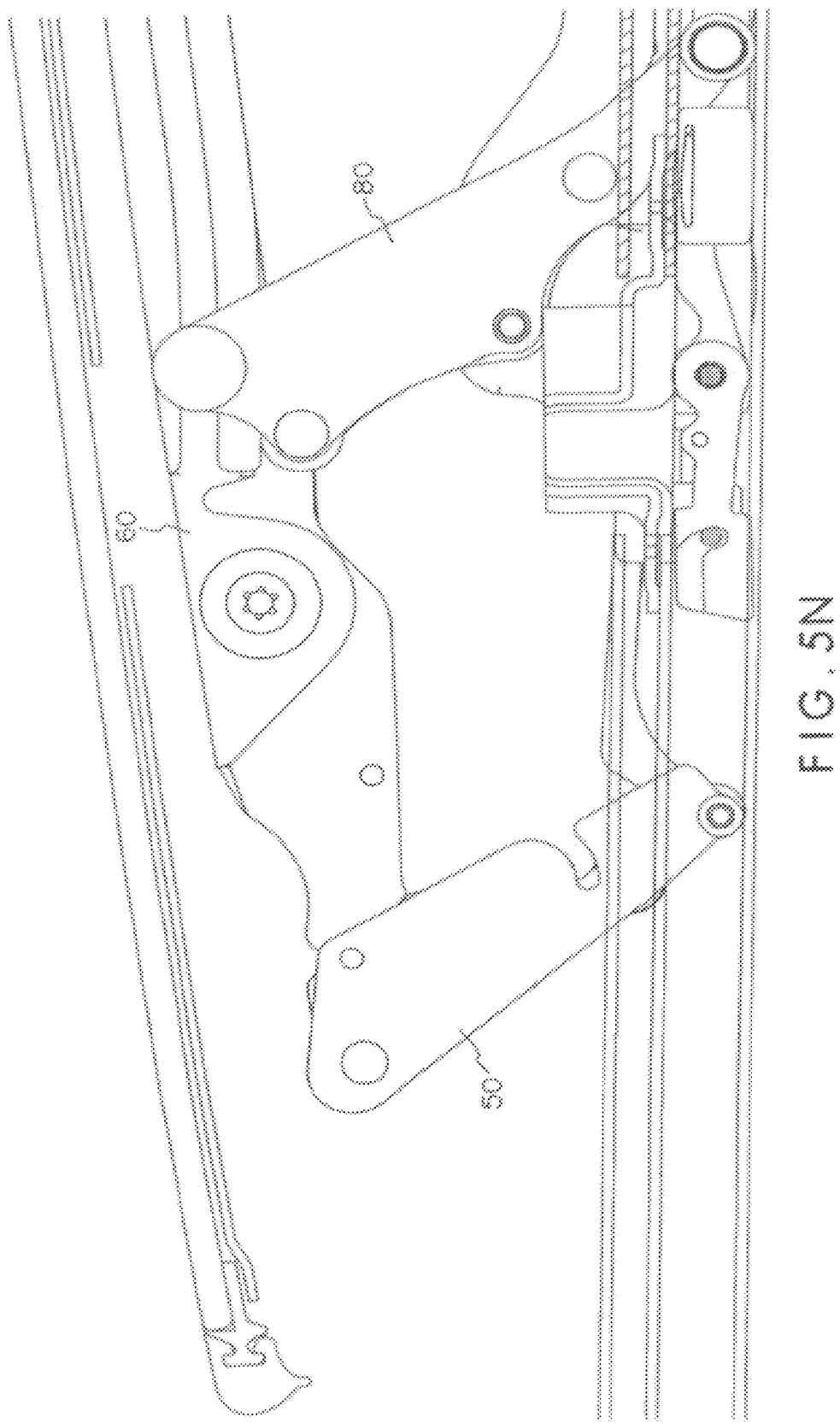

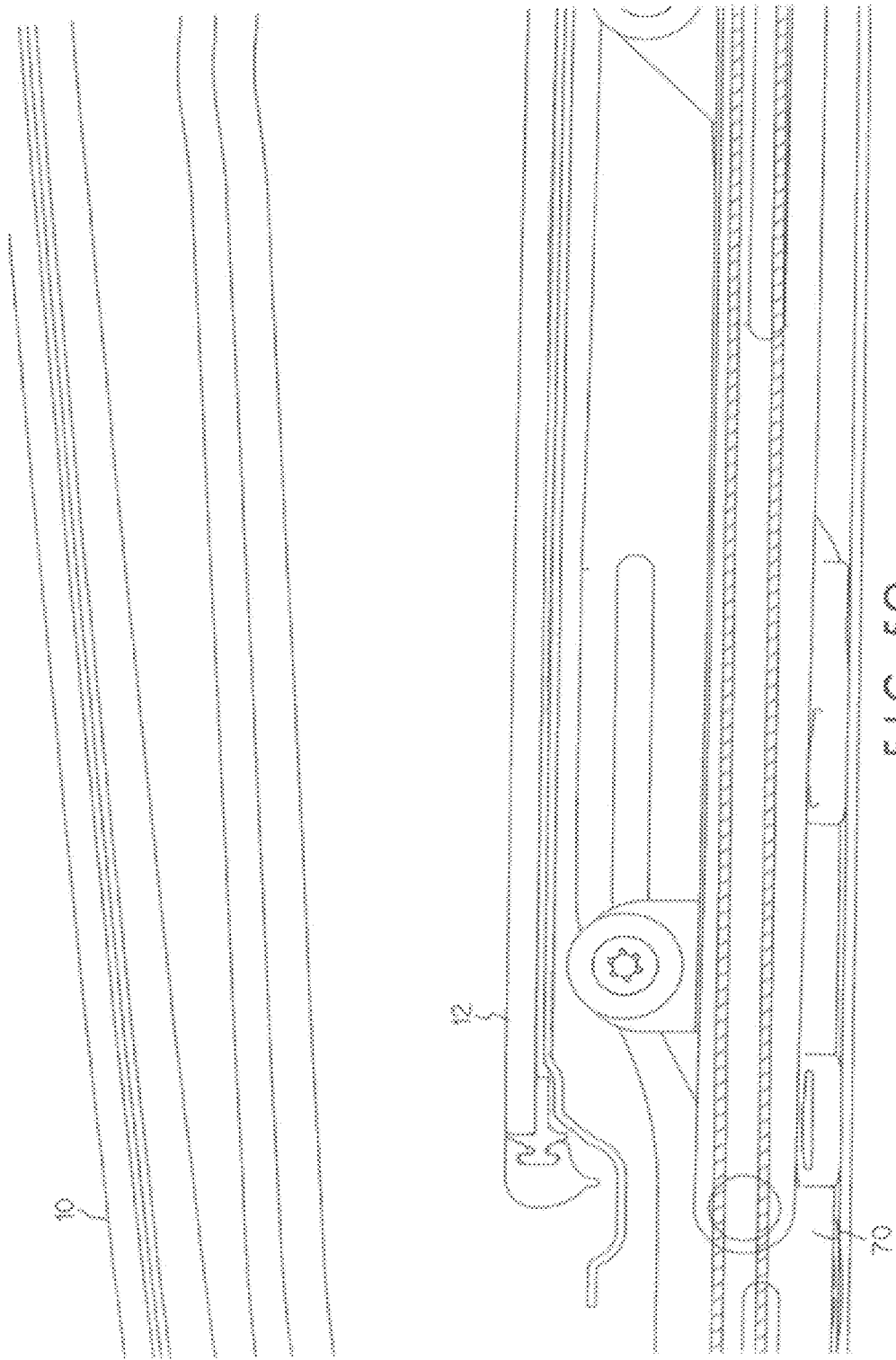

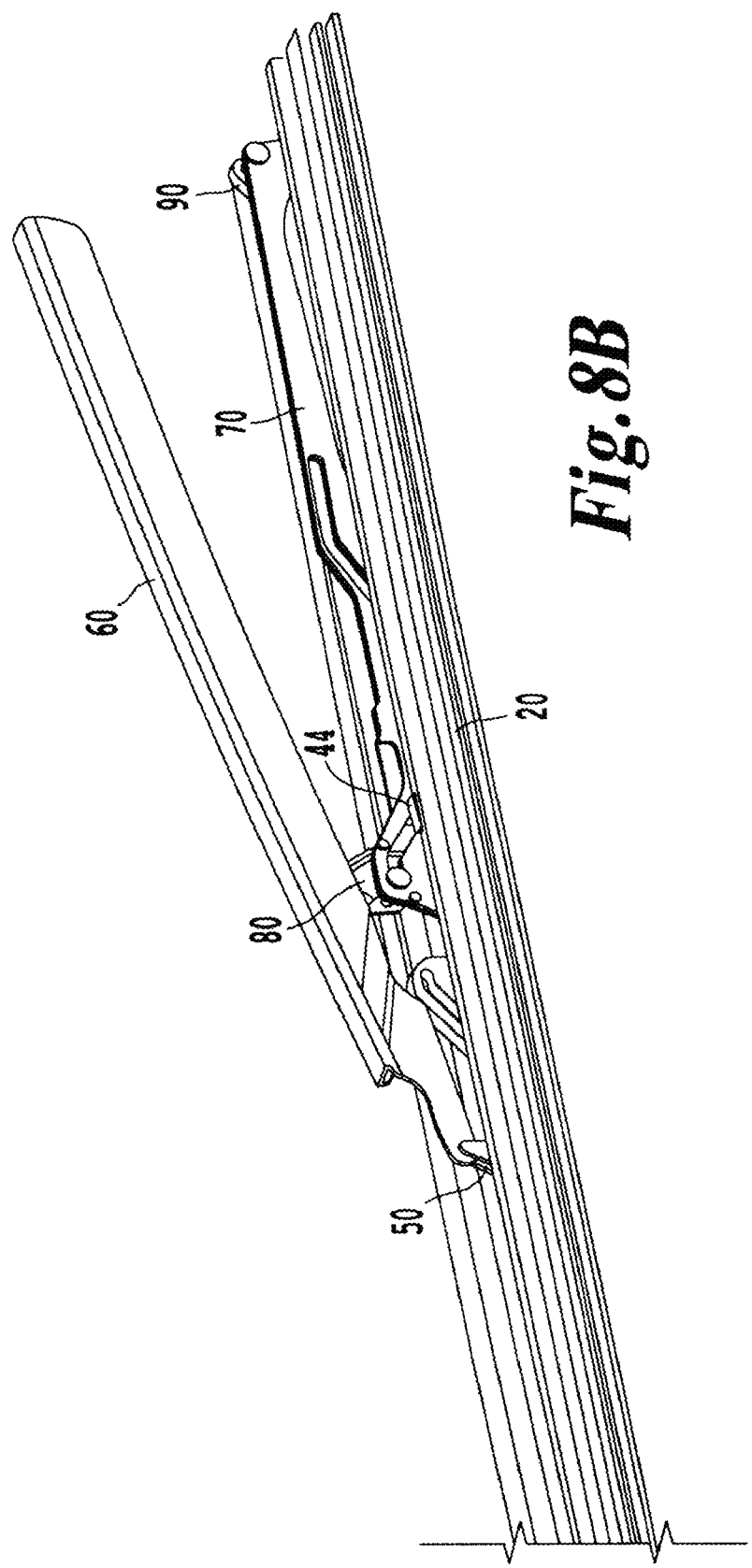

DUAL PANEL SUNROOF

CROSS-REFERENCE TO RELATED APPLICATIONS

This document claims priority to U.S. Provisional Application No. 61/263,044, filed Nov. 20, 2009, the entire contents of which are hereby incorporated by reference.

FIELD OF THE INVENTION

A dual panel sunroof is provided. More particularly, a dual panel sunroof is provided that combines a system that creates a retracting motion of a rear glass panel with a reduced guide depth in a front portion of the track that guides the sunroof.

BACKGROUND OF THE INVENTION

Discussion of Background

It is known to use two panels in sunroof systems. However, these sunroof systems typically utilize an extremely deep guide unit on the forward part of the sunroof that greatly increases the overall thickness of the sunroof package. This increased packaging thickness significantly reduces the headroom that is available in the vehicle, and thereby limits the use of two panel sunroofs to large vehicles such as sport utility vehicles or minivans.

SUMMARY OF EXEMPLARY ASPECTS OF THE ADVANCEMENTS

In one aspect, a dual panel sunroof is provided. The sunroof includes a front glass guide that supports a front glass panel and a rear glass guide that supports a rear glass panel. The rear glass panel is disposed rearward of the front glass panel when the dual panel sunroof is in a fully closed position. A front link is rotatably mounted to a front portion of the front glass guide such that the front link drives a front end of the front glass in an upward direction away from a vehicle body when the front link is driven in a rearward direction.

In another aspect, a dual panel sunroof includes a front glass guide that supports a front glass panel and a rear glass guide that supports a rear glass panel. The rear glass panel is disposed rearward of the front glass panel when the dual panel sunroof is in a fully closed position. A center guide links the front glass guide to the rear glass guide. The center guide and the rear glass guide are mutually engaged such that the rear glass guide is driven substantially downward without substantial translation in a forward or a rearward direction during an initial retract phase of opening the dual panel sunroof.

In another aspect, a dual panel sunroof includes a front glass guide that supports a front glass panel and a rear glass guide that supports a rear glass panel. The rear glass panel is disposed rearward of the front glass panel when the dual panel sunroof is in a fully closed position. A center guide links the front glass guide to the rear glass guide so as to guide vertical motion of each of the front glass guide and the rear glass guide as the center guide is driven in a rearward or a forward direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 illustrates an exploded view of a center guide and a rear glass guide for the dual panel sunroof in accordance with an exemplary aspect of the disclosure;

FIGS. 4a-4d illustrate cross sectional views along a first cross-section of the dual panel sunroof in various stages of operation in accordance with an exemplary aspect of the disclosure;

FIGS. 5a-5d illustrate overlay views along a second cross-section of the dual panel sunroof in various stages of operation in accordance with an exemplary aspect of the disclosure;

FIGS. 5e-5g illustrate a detailed views of the second cross-section of the dual panel sunroof as shown in FIG. 5a;

FIGS. 5h-5j illustrate a detailed views of the second cross-section of the dual panel sunroof as shown in FIG. 5b;

FIGS. 5k-5m illustrate a detailed views of the second cross-section of the dual panel sunroof as shown in FIG. 5c;

FIGS. 5n and 5o illustrate a detailed views of the second cross-section of the dual panel sunroof as shown in FIG. 5d;

FIGS. 8a and 8b are perspective views of the dual panel sunroof in a fully opened position in accordance with an exemplary aspect of the disclosure.

DETAILED DESCRIPTION OF THE PREFERRED EMBODIMENTS

Figure 1:
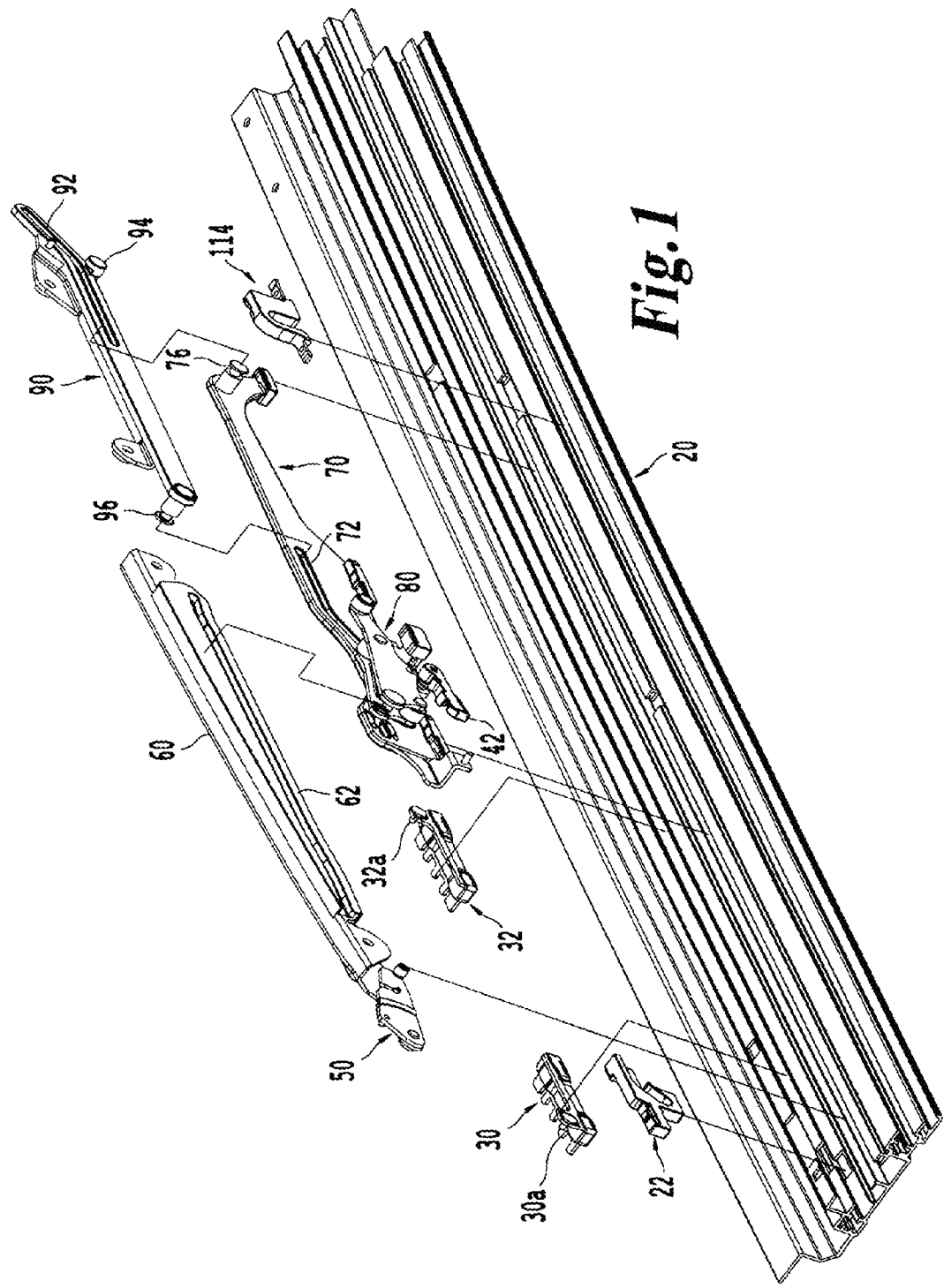
FIG. 1 illustrates an exploded view of a guide system for a dual panel sunroof in accordance with an exemplary aspect of the disclosure.
Figure 2:
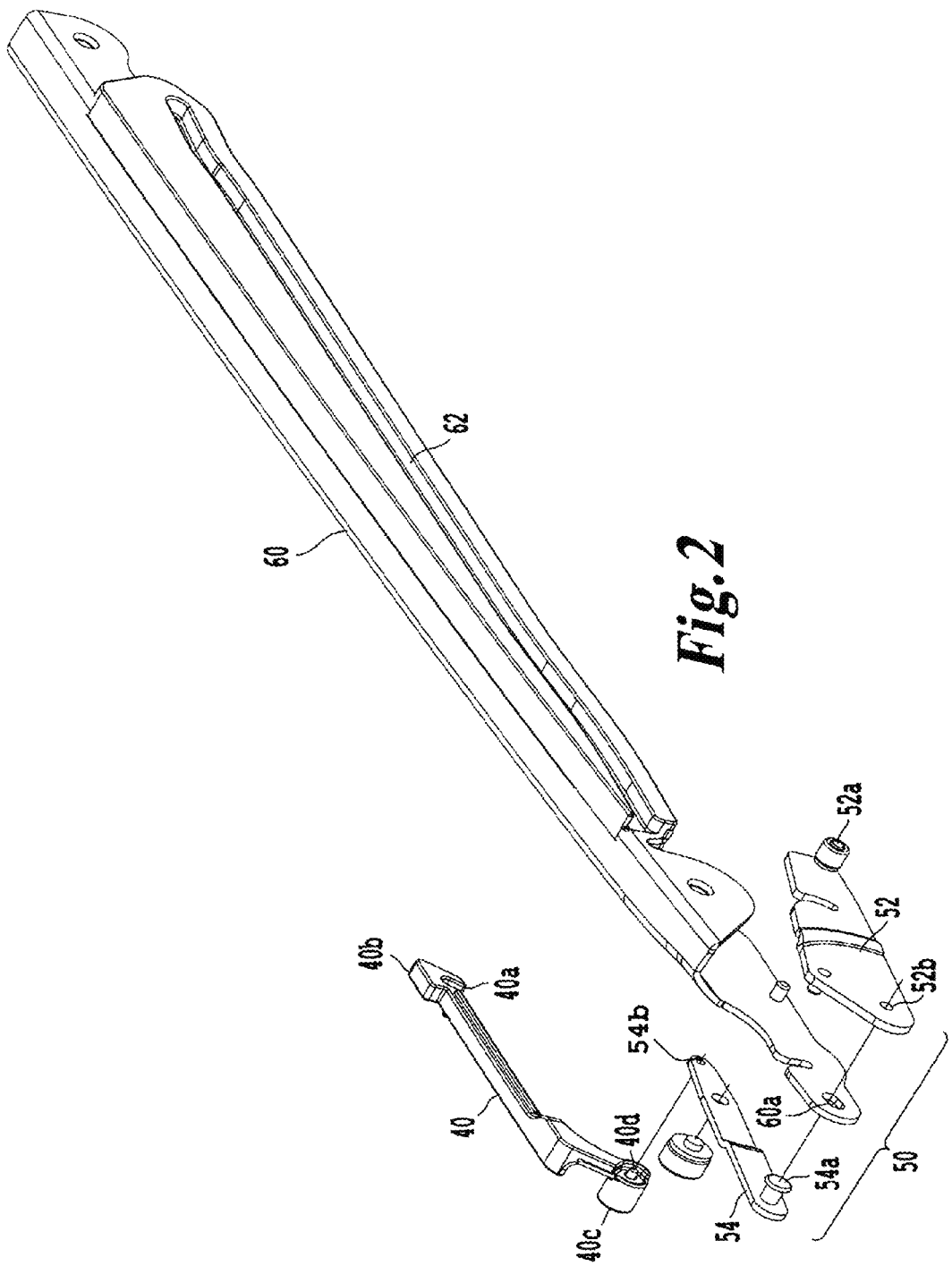
FIG. 2 illustrates an exploded view of a front glass guide for the dual panel sunroof in accordance with an exemplary aspect of the disclosure.
Figure 4A:
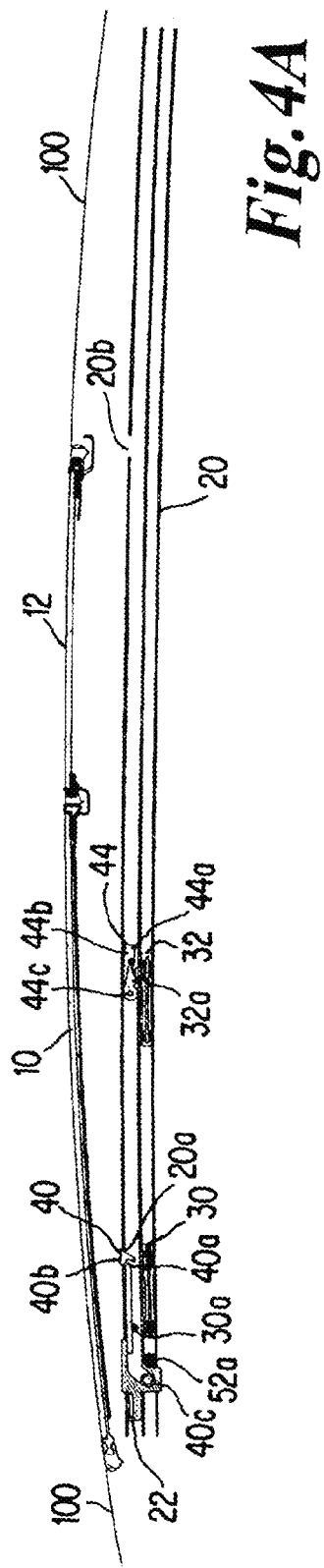
Figure 4B:
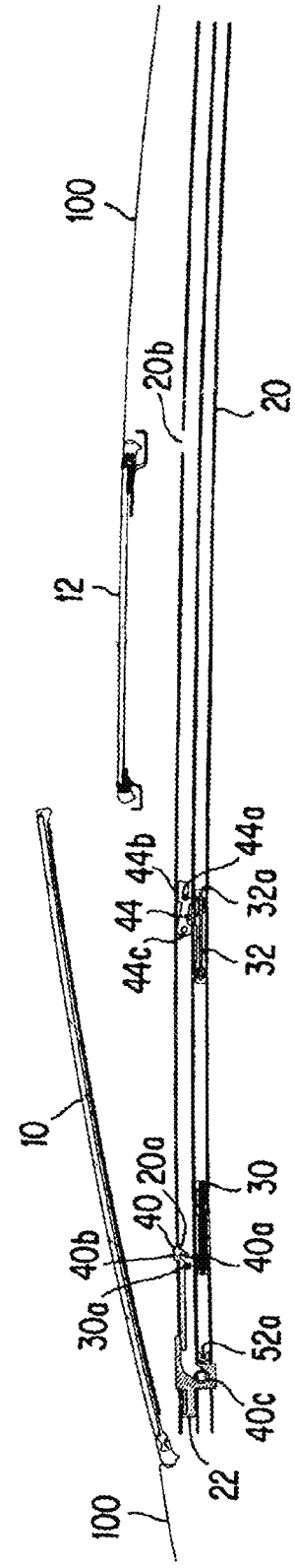
Figure 5E:
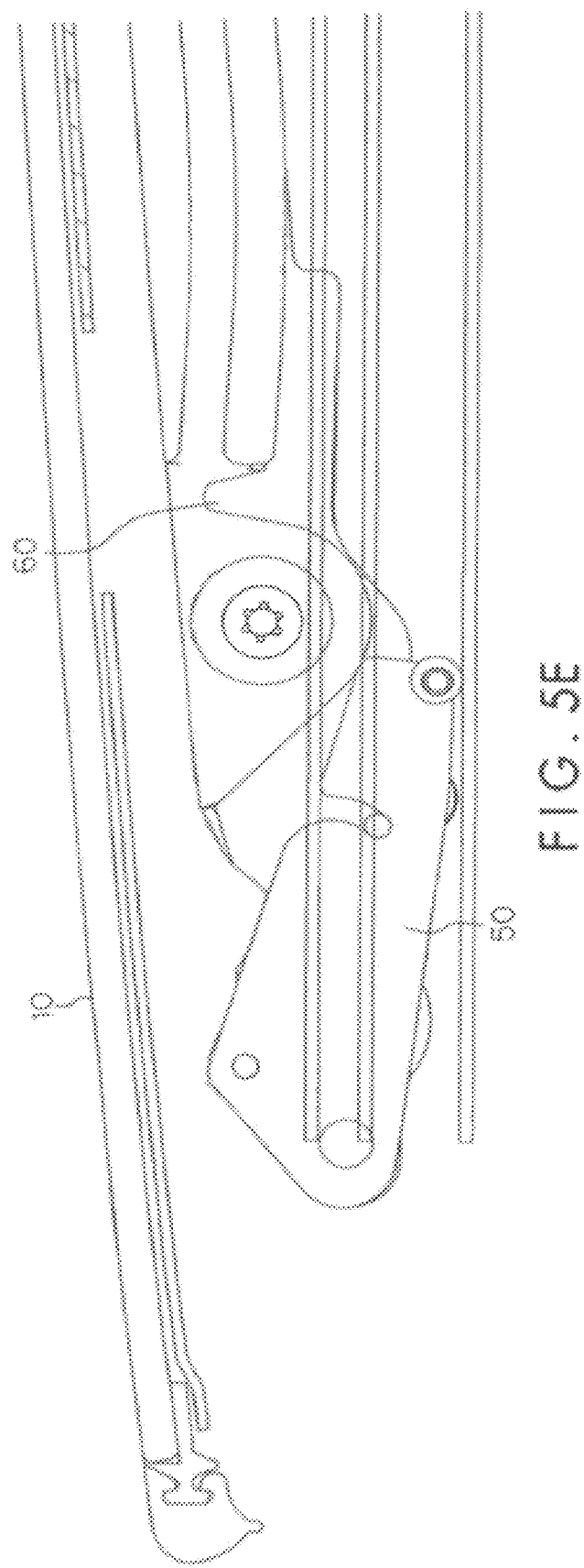
Figure 6:
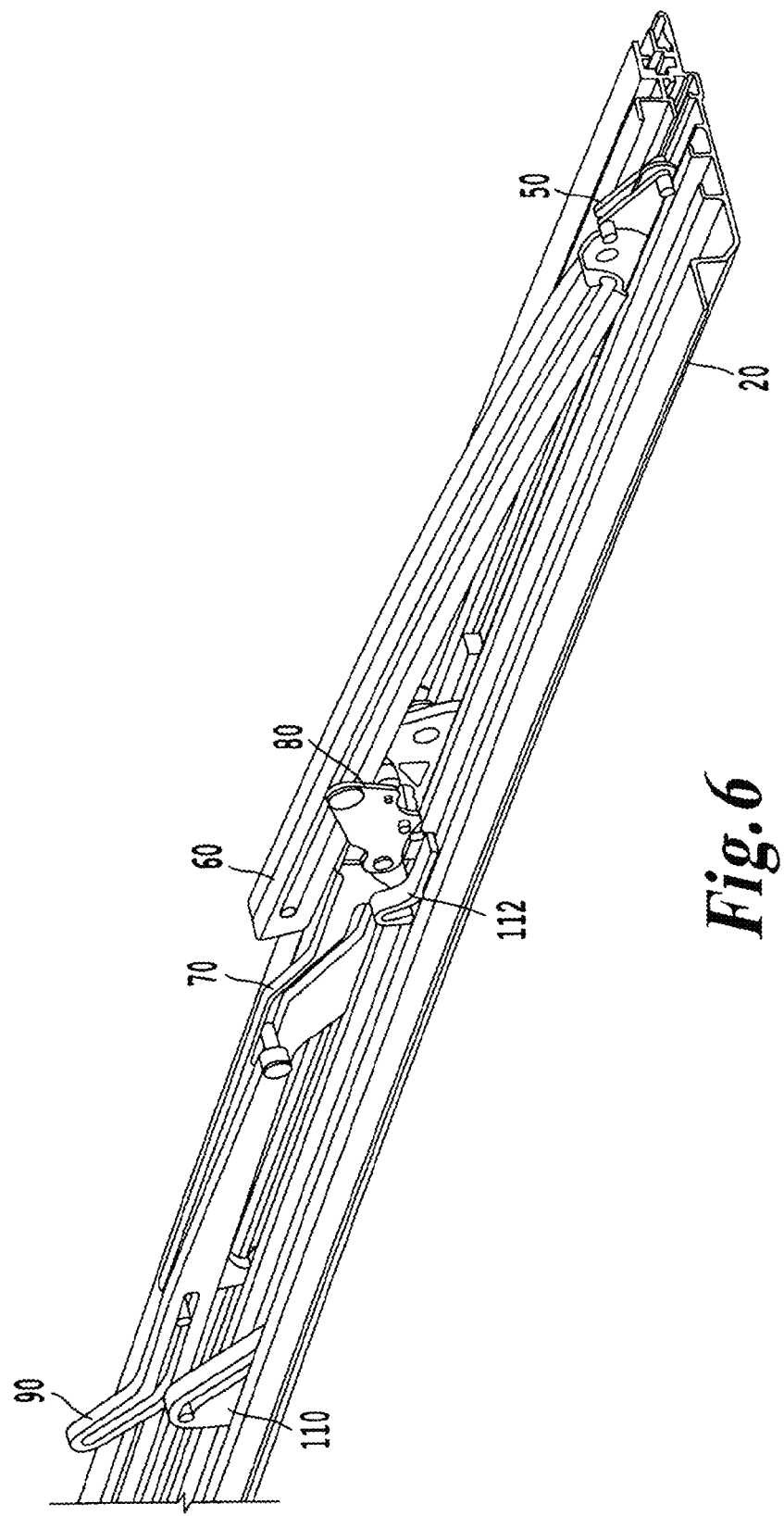
FIG. 6 is a perspective view of the dual panel sunroof in a closed position in accordance with an exemplary aspect of the disclosure.
Figure 7A:
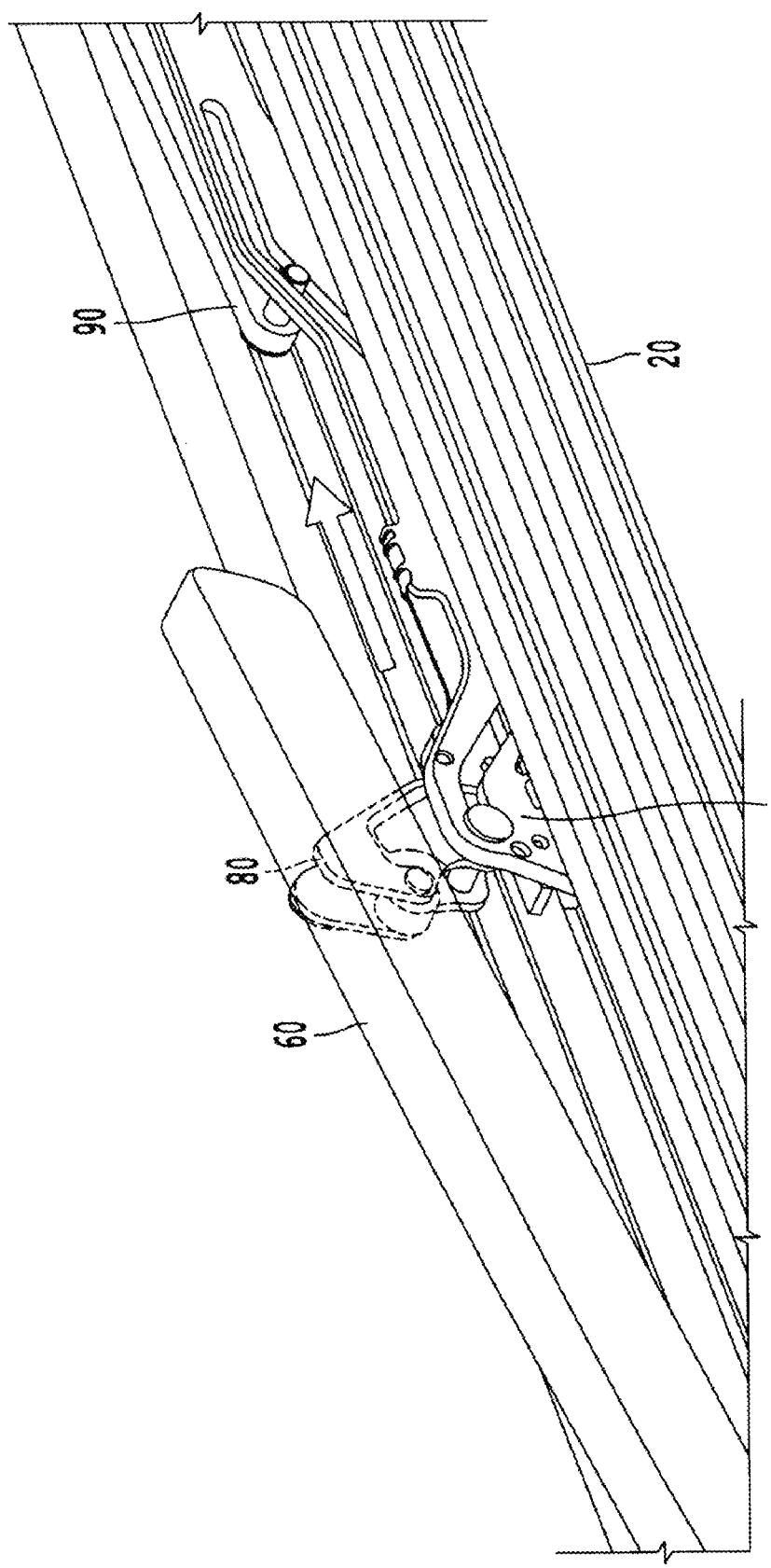
FIGS. 7a and 7b are perspective views of the dual panel sunroof in a vent position in accordance with an exemplary aspect of the disclosure.
Figure 7B:
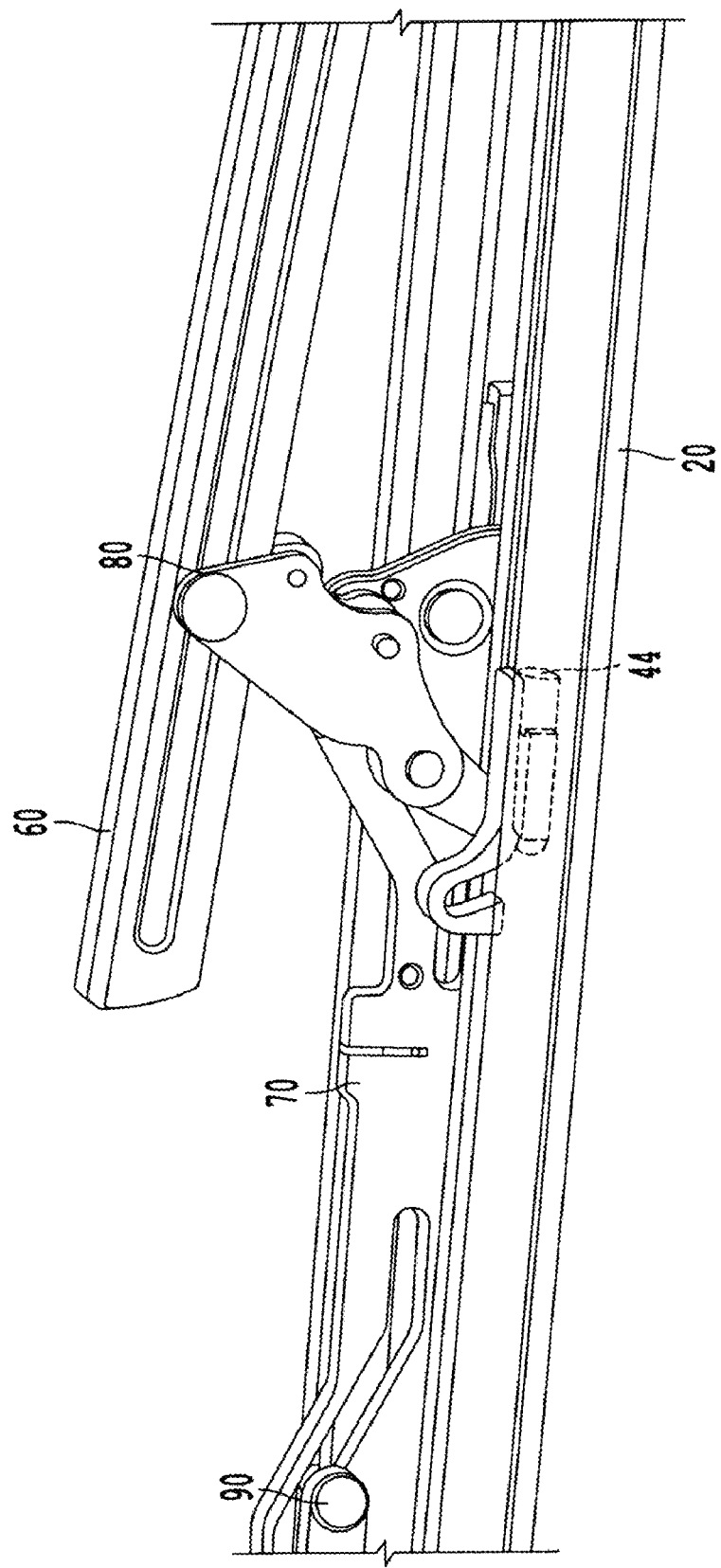
Figure 8A:
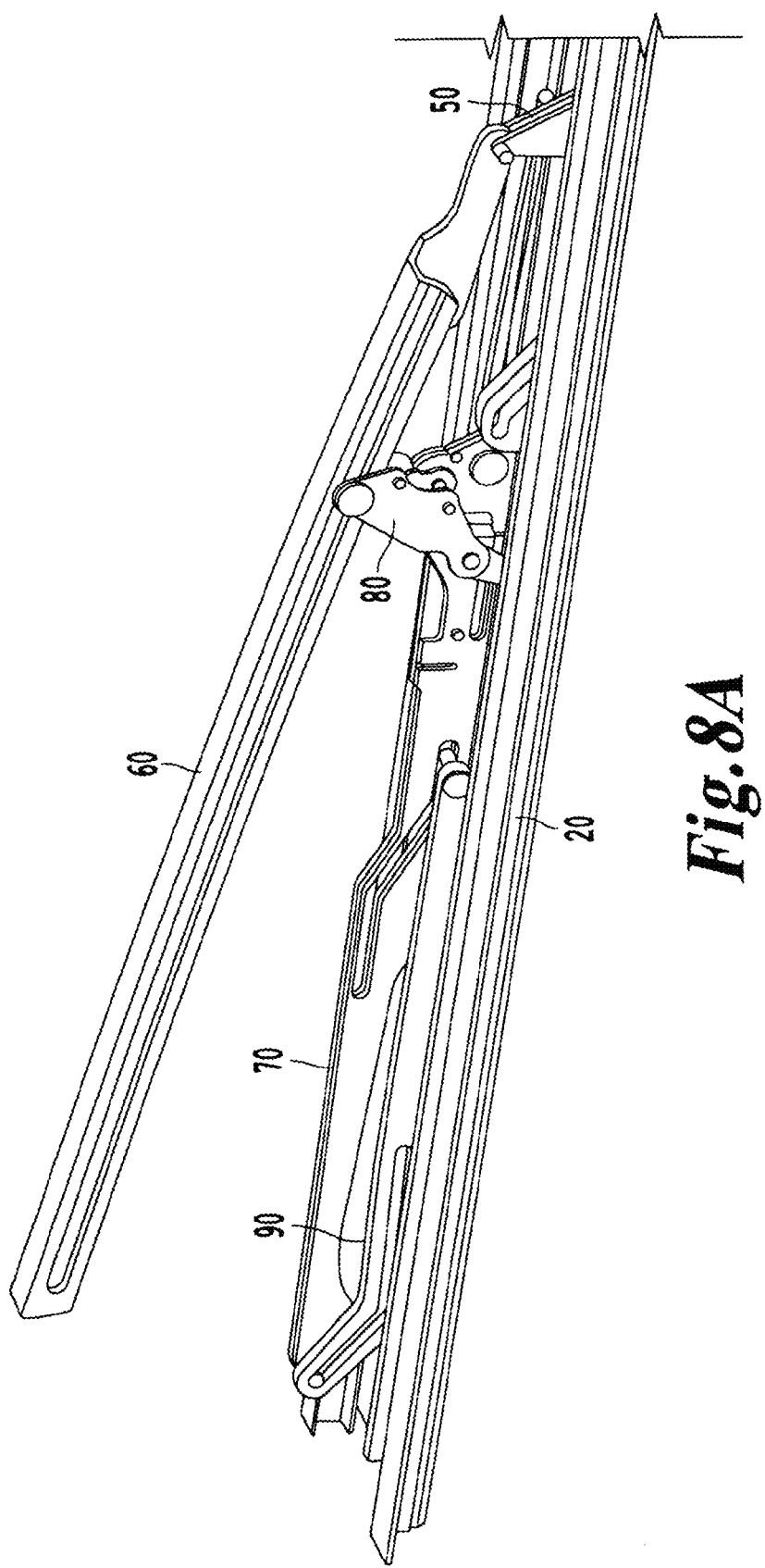

FIGS. 1-8 illustrate several views of a guide system for a dual panel sunroof. In particular, FIGS. 1-3 illustrate several exploded views of the guide system, FIGS. 4 and 5 respectively illustrate several cross-sectional views and several overlay views of the guide system at various stages of operation, and FIGS. 6-8 illustrate several perspective views of the guide system at various stages of operation. Although the figures illustrate a single side of the guide system for ease of illustration, corresponding parts are located on the opposite side of the dual panel sunroof. However, systems that incorporate aspects of the below-described guide system only on a single side of a dual panel sunroof are not outside the scope of the present disclosure.

I. System Overview.

As can be seen in FIGS. 4 and 5, the dual panel sunroof includes two glass panels: an A-glass 10 and a B glass 12. The A-glass 10 is disposed in front of the B-glass 12 in the longitudinal direction of the vehicle in which they are installed. The A-glass 10 is supported by an A-glass guide 60, and the B-glass 12 is supported by a B-glass guide 90. For ease of understanding, the A-glass 10 and the B-glass 12 are not illustrated in FIGS. 1-3 or FIGS. 6-8.

The design illustrated in FIGS. 1-8 integrates a center guide 70 and the B-glass guide 90 to reduce the amount of parts required to achieve the same motion. As will be described in detail below, the B-glass guide 90 moves in a substantially vertical drop motion to reduce the packaging space and save head room for vehicle occupants. A front link 50 pivots at a front of an A-glass guide 60 to allow the A glass 10 to come to a fully open position that is substantially parallel to the vehicle's roof surface to improve final appearance and reduce wind noise experienced by the vehicle's occupants. This guide system also uses mechanical checks for a simplified, robust functionality and part count reduction. Due to the simplified design and reduced part count, a single motor can power the function of the entire module.

In one exemplary embodiment, the dual panel sunroof is operated by a rocker switch located near the map lamp of the vehicle. Activating the rocker switch causes a voltage to be sent to a motor that drives the motion of sunroof. The motor rotates a gear that is engaged with and thereby drives a toothed belt. Although a belt system is described in the present example, other drive systems are possible without deviating from the scope of the present invention, as would be readily apparent to one having ordinary skill in the art. The belt is attached to a front drive shoe 30 and a rear drive shoe 32 that are each slidably mounted in a channel of a track 20. The two drive shoes 30 and 32 respectively include pins 30a and 32a that engage and disengage with various checks in the guide system depending upon an axial position of the guide shoes 30 and 32. In the present example, the dual panel sunroof includes a front check 40, a center link check 42 and a center guide check 44 (illustrated in FIG. 3). As will be explained in greater detail below, the motion of the checks 40, 42 and 44 will direct the motion related to opening and closing the dual panel sunroof.

The relationship between the center guide 70 and B-glass guide 90 that is described below provides for a drop downward of the B-glass as part of an initial retract phase of opening that is free of additional rotation and free of additional translation in a forward or a rearward direction. This motion can be a linear drop motion directly downward without motion in any other direction. Further, as discussed in detail below, the design of the front link 50 reduces the need for an extremely deep guide in front of the track 20. The combination of the ability to create a downward drop of the B-glass and the ability to reduce the depth of a guide in front of the track 20 allows the packaging thickness for the headroom of the vehicle to be significantly reduced, such that a dual panel sunroof can be used in applications where only a single panel sunroof would fit using prior designs.

A. Front Glass Guide.

As can be seen in FIG. 1, the dual panel sunroof in the illustrated example includes a track 20 that includes multiple channels that receive the drive shoes 30 and 32 and the checks 40, 42 and 44. FIG. 2 provides a more detailed view of the front check 40, the front link 50 and the A-glass guide 60.

The A-glass guide 60 includes a longitudinal slot 62. As can be seen in FIGS. 1, 2 and 6-8, a center link 80 is slidably engaged in the longitudinal slot 62 of the A-glass guide 60. Returning to FIG. 2, the front link 50 includes a link member 54 and a pivot member 52. The link member 54 and the pivot member 52 are arranged on opposite sides of the A-glass guide 60 at a front end of the A-glass guide 60 with respect to the longitudinal direction of the vehicle. The pivot member 52 has an oblong body that extends from a first end that includes an opening 52b to a second end that includes a roller 52a. The link member 54 includes an elongated body that extends from a first end that includes a pin 54a to a second end that includes an opening 54b. The pin 54a extends through a slot 60a of the A-glass guide 60 and an opening 52b of the pivot member 52 so as to link each of the link member 54, the A-glass guide 60 and the pivot member 52 together. The resulting assembly can be seen in FIGS. 1, 6 and 8. As can be seen in FIG. 4A, when the sunroof is in the fully closed state, the roller 52a of the front link 50 is positioned in one of the channels of the track 20.

As will be described in greater detail below, the front link 50 is used as a secondary pivot to drive the A-glass 10 substantially parallel to the vehicle body by lifting a front edge of the A-glass 10 up. Depending on the location of the connection between the front glass guide and the center guide, this motion also drives a rear edge of the A-glass 10 downwards as the A-glass 10 pivots about the point of connection between the front glass guide and the center guide. This construction prevents the A-glass 10 from becoming a wind-sail that presents a large profile that creates a wind obstruction. In addition, this design reduces the need for an extremely deep guide in front of the track 20. An extremely deep guide in front of the track 20 can cause the interior ceiling height in front of the head of passengers in the front seat of the vehicle to be lower, thus increasing risks to passenger safety. In the present design, by contrast, the guide 22 fits within one of the channels of the track 20 and the additional height change of the A-glass 10 is achieved by a rotating link (the front link 50). In other words, the front link 50 is a rotating link at the front of the A-glass 10 that drives the A-glass 10 substantially parallel to the vehicle body. Specifically, the rotation of the link 50 amplifies the front end height change of the A-glass 10 as the link 50 is driven rearward between the vent and open positions. The rotation of the front link 50 also allows for a smaller overall package because the front link 50, which is oblong in shape, is rotated to an orientation that has a smaller height when the sunroof is fully closed or in the vent position. This allows for the dual panel sunroof to be employed in smaller vehicles rather than be limited to larger vehicles that have large interior ceiling heights.

The front check 40 has an elongated body that extends from a first end that includes a cam 40b and an inclined recess 40a to a second end that includes a roller 40c. The cam 40b has a hammer-head shape that selectively engages with a slot 20a of the track 20 depending on the position of the front check 40 and the guide shoe 30. The inclined recess 40a has a hook shape that engages with the pin 30a of the guide shoe 30 depending on the location of the guide shoe 30. The front check 40 further includes a pin 40d arranged coaxially with the roller 40c that engages with a corresponding opening 54b on the link member 54 of the front link 50. The pin 40d acts as a pivot point about which the front check 40 pivots depending on the location and direction of motion of the guide shoe 30. For example, as can be seen in FIG. 4A, when the sunroof is in the fully closed state, the roller 40c is initially positioned in a guide 22 that is located at a front end of the track 20 in the longitudinal direction of the vehicle. In this state, the pin 30a biases the front check 40 upwards such that the cam 40b is fully engaged in the slot 20a of the track 20. In this position, the front check 40 is prevented from either pivoting or moving along the track longitudinal direction of the vehicle. Further, when the cam 40b is engaged in the slot 20a of the track 20, the front link 50 is prevented from moving axially by way of the engagement between the front check 40 and the front link 50.

B. Center Guide and Rear Glass Guide.

FIG. 3 provides a more detailed view of the center guide 70, the center link 80, the B-glass guide 90, the center link check 42 and the center guide check 44.

The center guide 70 is an elongated member that includes an S-shaped slot 72 and a Z-shaped slot 74. The B-glass guide 90 is an elongated member that includes a slot 92 shaped like an inclined "L." The rear end of the center guide 70 includes a pin 76 that is slidably engaged in the slot 92 of the B-glass guide 90. The front end of the B-glass guide 90 includes a pin 96 that slidably engages the S-shaped slot 72 of the center guide 70. As can be seen in FIG. 3, in the closed and vent positions, the pin 96 is engaged in the highest portion of the slot 72 in the vertical direction, and the pin 76 is engaged in the lowest portion of the slot 92 in the vertical direction. The design of the center guide 70 integrates motion into a single guide by both driving the vent-up position of the A-glass 10 while also facilitating the rearward drop of the B-glass. As will be explained in greater detail below, the relationship between the center guide 70 and B-glass guide 90 allows the B-glass to drop substantially downward, free of additional rotation or translation in a forward or rearward direction, of as part of an initial retract phase. During the initial retract phase, the pin 96 is slidably engaged with the slot 72 so as to be guided by the slot 72, and the pin 76 is simultaneously slidably engaged with the slot 92 so as to be guided by the slot 92. This mutual engagement between the center guide 70 and B-glass guide 90 creates a scissor motion during the initial retract phase that results in the translation of the B-glass downward. The B-glass guide 90 further includes a cylindrical member 94 that, depending upon the position of the B-glass guide 90, engages a B-glass guide block 114 (illustrated in FIGS. 1 and 5).

As best illustrated in FIG. 3, the center link 80 includes a support member 82, a link member 84 and a pivot center 86. The pivot center 86 is arranged between the support member 82 and the link member 84. The support member 82 and the link member 84 are engaged with each other and the pivot center 86 so as to be able to rotate about the pivot center 86. The support member includes a pin 82a, a roller 82b, a roller 82c and a pin 82d. The link member 84 includes a through hole 84a and a pin 84b. The pivot center 86 includes a through hole 86a and a shoe that is engaged with the track 20 and the check 42 via a pin 86b. In particular, the pin 86b of the pivot center 86 extends through a through hole 42c of the center link check 42.

The center link 80 is engaged with both the center guide 70 and the A-glass guide 60. Specifically, the pin 82a extends through the through hole 86a of the pivot center 86 and the through hole 84a of the link member 84 and engages the Z-shaped slot 74 of the center guide 70, and the pin 82d of the support member 82 of the center link 80 is engaged with the slot 62 of the A-glass guide 60. FIG. 1 is an exploded view that illustrates a partially assembled state in which the support member 82, the link member 84 and the pivot center 86 are depicted as the assembled center link 80.

There is only one degree of freedom between the pivot center 86 and the portions 82 and 84 such that when the check 42 immobilizes the pivot center 86 in the longitudinal direction, the engagement between the center link 80 and the Z-shaped slot 74 of the center guide 70 causes the portions 82 and 84 to rotate. This rotation also forces the A-glass support 60 to pivot due to the fact that the pin 82d of the center link 80 is engaged with the slot 62 of the A-glass guide 60.

Returning to FIG. 3, the center link check 42 includes an elongated body that extends from a first end that includes a through hole 42c to a second end that includes a cam 42b and a recess 42a. Depending on the position of the center link check 42 and the center guide 70, the cam 42b selectively engages with a slot 20c of the track 20, and the recess 42a selectively engages with a pin 78 of the center guide 70. For example, as can be seen in FIG. 5A, when the sunroof is in the fully closed state, the cam 42b is fully engaged with the slot 20c of the track 20. By contrast, FIGS. 5C and 5D illustrate states in which the pin 78 of the center guide 70 is engaged with the recess 42a of the center link check 42. In FIGS. 5C and 5D, the cam 42b of the center link check 42 is pulled up into the track 20, which allows the center guide 70 to move towards the rear of the vehicle. As noted above, the pin 86b on the pivot center 86 extends through the though hole 42c of the center link check 42 so as to link the center link 80 to the center link check 42. In this configuration, the center link check 42 can rotate relative to the center link 80 about a pivot center located at the through hole 42c, but the center link 80 and the center link check 42 cannot move relative to each other in the longitudinal direction of the vehicle. A spring 43 provides a biasing force that urges the center link check 42 to rotate about the pivot center located at the through hole 42c such that the cam 42b is continuously urged downwards in the track 20.

The center guide check 44 includes an elongated body that extends from a first end that includes a through hole 44c to a second end that includes a cam 44b and a recess 44a. Depending on the position of the center guide check 44 and the rear guide shoe 32, the cam 44b selectively engages with a slot 20b of the track 20, and the recess 44a selectively engages with the pin 32a of the rear drive shoe 32. As best illustrated in FIG. 3, the center link check 42 and the center guide check 44 have the same overall body shape, but an opposite orientation. Specifically, the center link check 42 is rotated 180 degrees with respect to the center guide check 44. A pin on the center guide 70 extends through the though hole 44c of the center guide check 44 so as to link the center guide 70 to the center guide check 44 at the front end of the center guide 70 and the front end of the center guide check 44. In this configuration, the center guide check 44 can rotate relative to the center guide 70 about a pivot center located at the through hole 44c, but the center guide 70 and the center guide check 44 cannot move relative to each other in the longitudinal direction of the vehicle. A spring 45 provides a biasing force that urges the center guide check 44 to rotate about the pivot center located at the through hole 44c such that the cam 44b is continuously urged upwards in the track 20. As can be seen in FIG. 4A, when the sunroof is in the fully closed state, pin 32a of the rear drive shoe 32 is engaged with the recess 44a of the center guide check 44. In this position, the cam 44b of the center guide check 44 is pulled down into the track 20, which allows the rear drive shoe 32 to move towards the rear of the vehicle.

II. System Operation.

As noted above, the dual panel sunroof is operated by a rocker switch located near the map lamp of the vehicle. Activating the rocker switch causes a voltage to be sent to a motor that drives the motion of sunroof. The motor rotates a gear that is engaged with and thereby drives a toothed belt. Although a belt system is described in the present example, other drive systems are possible without deviating from the scope of the present invention, as would be readily apparent to one having ordinary skill in the art.

A. From Fully Closed Position to Vent Position.

Starting with the sunroof in the fully closed position, the user flips the rocker switch to the open position. This engages the motor and turns the motor gear in a counterclockwise motion. The motor gear is engaged to two belts. The belts move rearward down the track. As illustrated in FIGS. 4A, 4B, 5A and 5B, when the motor (not depicted) is activated and the belt (not depicted) begins to move, the front drive shoe 30 pushes up on the front check 40 forcing it to be engaged in an opening 20a of the track 20 thus preventing the front link 50 from rotating or moving. This also prevents the A-glass guide 60 from moving axially rearward because, as illustrated in FIG. 2, the front link 50 is engaged with the A-glass guide 60.

At this stage, the rear drive shoe drives the center guide 70 rearward via the center guide check 44. Specifically, the cam 44b on the center guide check 44 is pulled down into the track 20 allowing the rear drive shoe 32 to move. As the center guide check 44 is linked to the center guide 70, this engagement causes the motion of the rear drive shoe 32 to be imparted to the center guide 70.

At this point in time, the center link 80 is prevented from moving axially rearward in the track 20 because the cam 42b of the center link check 42 is locked in the slot 20c of the track 20. Although the center link 80 is not able to move rearward, the center guide 70 continues to move rearward. As noted above, the pin 82a of the center link 80 is engaged with the Z-shaped slot 74 of the center guide 70. The combination of the inability of the center link 80 to translate axially rearwards and the engagement with the Z-shape slot 74 causes the center link 80 to move upward in the Z-shaped slot 74 of the center guide 44. In effect, the support member 82 and the link member 84 rotate about the pivot center 86, which forces the A-glass support 60 to pivot upwards due to the fact that the pin 82d of the center link 80 is engaged with the slot 62 of the A-glass guide 60. The upward rotation forces the A-glass 10 to pivot. This is known as the "vent" position illustrated in FIGS. 4B, 5B, 7A and 7B.

B. From Vent Position to Fully Open Position.

The user can again flip the rocker switch to the open position. This will again engage the motor which will turn the motor gear in a counterclockwise motion. This will force the belts to move rearward driving the front 30 and rear 32 drive shoes rearward simultaneously. The rear drive shoe 32 will drive the center guide 70 rearward until the center guide 70 pulls on the A-glass guide 60 via the engagement between the center link 80 and the A-glass guide 60. This pulling will cause the front link 50 to rotate upward moving the A-glass 10 parallel with the vehicle's roof curvature. At the same time, the pin 30a of the front drive shoe 30 will continue pushing up on the front check 40 and thereby prevent the front link 50 and the A-glass guide 60 from moving rearward.

Simultaneously as the front link 50 is rotating upward, the front pin 78 of the center guide 70 engages the recess 42a of the center link check 42. This action causes the front pin 78 to pull the check 42 upward and thereby disengage the cam 42b of the check 42 from the slot 20c of the track 20. This action allows the center link 80 to move rearward with the center guide 70. As the front link 50 moves in the guide 22, the front link 50 is caused to rotate. When the front link 50 rotates to its full-up position, the pin 30a of the front drive shoe 30 will engage the recess 40a of the front check 40. The pin 30a pulls the cam 40b of the check 40 out of engagement with the slot 20a of the track 20, thereby allowing the A-glass 10 to move rearward with the front drive shoe 30.

As the A glass guide 60 and center guide 70 move rearward, the B-glass guide 90 is driven downward in a scissor motion guided by the engagement between the pin 96 of the B-glass guide 90 and the S-shaped groove 72 of the center guide 70 and by the engagement between the pin 76 of the center guide 70 and the L-shaped groove 92 in the B-glass guide 90. During this motion, the B-glass guide 90 is prevented from moving rearward by the engagement between the cylindrical member 94 and the B-glass guide block 114. As can be seen in FIG. 5C, when the cylindrical member 94 passes into the channel in the track 20, the cylindrical member 94 will be clear of the B-glass guide block 114. At this point the B-glass guide 90 will be free to move rearward with the center guide 70, center link 80, front link 50, and A-glass guide 60.

The front and rear drive shoes 30 and 32 then continue their progress rearward. As the B-glass 12 reaches its full open position, the cam 44b of the center guide check 44 springs up into engagement with the slot 20b of the track 20. When the cam 44b of the center guide check 44 engages the track 20, the center guide check 44 is released from the rear drive shoe 32. This will lock the B-glass 12 into its full-open position and allow the rear drive shoe 32 to travel rearward freely in the track 20. As the front drive shoe 30 continues to move rearward the engagement between the pin 30a of the front drive shoe and the recess 40a of the front check 40 continues to move the front link 50 rearward. This action thereby drives the A-glass guide 60 rearward. As noted above, the A-glass guide 60 has a long horizontal slot 62 that the center link 80 rides in via the pin 82d. As the A-glass 10 moves rearward, the center link 80 supports the A-glass guide 60 keeping the A-glass 10 in an upward position. Once the A-glass 10 reaches full open position, power to the motor is disengaged. The motor gear will be locked into position not allowing the belt to travel any further. This results in the fully open position illustrated in FIGS. 4D, 5D, 8A and 8B.

C. From Fully Open Position to Vent Position.

To close the glass the user activates the close rocker. The motor moves in a clockwise motion pulling the belt forward. The front drive shoe 30 is then driven forward, pulling the front link 50 along with it. The front link 50 drives the A-glass 10 forward while being supported by the pin attached to the center link 80. Simultaneously the rear shoe 32 begins to move forward and the pin 32a of the rear drive shoe 32 engages with the recess 44a of the center guide check 44. This action pulls the cam 44b of the check 44 downward and free of the slot 20b of the track 20 and allows the center guide 70 to travel forward. As the rear drive shoe 32 moves forward, the B-glass guide 90 engages the B-glass guide block 114 forcing the B-glass guide 90 to move upward along the S-shaped slot 72 of the center guide 70 and the L-shaped slot 92 of the B-glass guide 90 in a scissor motion returning the B-glass 12 to a fully closed position. As the B-glass 12 is moving into its closed position, the front drive shoe 30 forces the cam 40b of the front check 40 to engage into the slot 20a of the track 20. This action forces the front link 50 to rotate downward. This will leave only the rear of the A-glass 10 pivoted upward. The rear drive shoe 32 will then continue to be driven forward until the cam 42b of the center link check 42 is forced to engage the slot 20c of the track 20 and the pin 78 of the center guide 70 disengages the recess 42a of the center link check 42. This returns the A-glass 10 to the "vent" position illustrated in FIGS. 4B, 5B, 7A and 7B.

D. From Vent Position to Fully Closed Position.

In order to move from the vent position to the fully closed position, the user can again hit the close switch to engage the motor to move in a clockwise motion. This will move the belt forward, driving the rear drive shoe 32 forward. This will pull the center guide 70 rearward. Because the center link check 42 is engaged in the slot 20c of the track 20, the center link 80 cannot travel in the axial direction, but is instead forced to travel in the Z-shaped slot 74 on the center guide 70, which causes the center link 80 to rotate downward returning the A-glass 10 to the full-closed position illustrated in FIGS. 4A and 5A.

Obviously, numerous modifications and variations of the present invention are possible in light of the above teachings. It is therefore to be understood that within the scope of the appended claims, the invention may be practiced otherwise than as specifically described herein.

The invention claimed is:

1. A dualpanel sunroof, comprising:
a front glass guide that supports a front glass panel;
a rear glass guide that supports a rear glass panel, wherein the rear glass panel is disposed rearward of the front glass panel when the dual panel sunroof is in a fully closed position; and
a center guide that links the front glass guide to the rear glass guide,
wherein the center guide and the rear glass guide are mutually engaged such that the rear glass guide is driven substantially downward without substantial translation in a forward or a rearward direction during an initial retract phase of opening the dual panel sunroof, and
wherein the rear glass guide includes a rear glass guide pin and the center guide includes a center guide pin, and wherein the rear glass guide includes a rear glass guide slot that receives the center guide pin and the center guide includes a center guide slot that receives the rear glass guide pin.

2. The dual panel sunroof of claim 1, wherein the rear glass guide slot is shaped like an inclined letter L and the center guide slot is an S-shaped slot.

3. The dual panel sunroof of claim 1, further comprising a guide block that prevents the rear glass guide from moving in the rearward direction while the center guide moves in the rearward direction, wherein the rear glass guide is driven downward in a scissor motion guided by the engagement between the rear glass guide pin and the center guide slot and by the engagement between the center guide pin and the rear glass guide slot when the rear glass guide is prevented from moving in the rearward direction by engagement between the rear glass guide and the guide block.

4. The dual panel sunroof of claim 1, wherein, in a initial state, the rear glass guide pin is engaged in an upper portion of the center guide slot, and the center guide pin is engaged in a lower portion of the rear glass guide slot.

5. A dual panel sunroof, comprising:
a front glass guide that supports a front glass panel;
a rear glass guide that supports a rear glass panel, wherein the rear glass panel is disposed rearward of the front glass panel when the dual panel sunroof is in a fully closed position; and
a center guide that links the front glass guide to the rear glass guide so as to guide vertical motion of each of the front glass guide and the rear glass guide as the center guide is driven in a rearward or a forward direction, and
wherein the center guide includes a center link that is rotatably engaged with the center guide and that is rotatably engaged with the front glass guide.

6. A dual panel sunroof, comprising:
a front glass guide that supports a front glass panel;
a rear glass guide that supports a rear glass panel, wherein the rear glass panel is disposed rearward of the front glass panel when the dual panel sunroof is in a fully closed position; and
a center guide that links the front glass guide to the rear glass guide so as to guide vertical motion of each of the front glass guide and the rear glass guide as the center guide is driven in a rearward or a forward direction,
wherein the center guide includes a first center guide slot that guides vertical motion of the front glass guide and a second center guide slot that guides vertical motion of the rear glass guide, and
wherein the center guide includes a center link that is rotatably engaged with the center guide and that is rotatably engaged with the front glass guide, and wherein the center link includes a first center link pin that is engaged with a longitudinal slot of the front glass guide and a second center link pin that is engaged with the first center guide slot.

7. A dual panel sunroof, comprising:
a front glass guide that supports a front glass panel;
a rear glass guide that supports a rear glass panel, wherein the rear glass panel is disposed rearward of the front glass panel when the dual panel sunroof is in a fully closed position; and
a center guide that links the front glass guide to the rear glass guide so as to guide vertical motion of each of the front glass guide and the rear glass guide as the center guide is driven in a rearward or a forward direction,
wherein the center guide includes a first center guide slot that guides vertical motion of the front glass guide and a second center guide slot that guides vertical motion of the rear glass guide, and
wherein the rear glass guide includes a rear glass guide pin and the center guide includes a center guide pin, and wherein the rear glass guide includes a rear glass guide slot that receives the center guide pin and the second center guide slot receives the rear glass guide pin.

8. The dual panel sunroof of claim 7, wherein the first center guide slot is a Z-shaped slot, the second center guide slot is an S-shaped slot and the rear glass guide slot is shaped like an inclined letter L.

9. The dual panel sunroof of claim 7, further comprising a guide block that prevents the rear glass guide from moving in the rearward direction while the center guide moves in the rearward direction, wherein the rear glass guide is driven downward in a scissor motion guided by the engagement between the center guide pin and the rear glass guide slot and by the engagement between the rear glass guide pin and the second center guide slot when the rear glass guide is prevented from moving in the rearward direction by engagement between the rear glass guide and the guide block.

* * * * *

UNITED STATES PATENT AND TRADEMARK OFFICE
CERTIFICATE OF CORRECTION

PATENT NO. : 8,177,295 B2
APPLICATION NO. : 12/727682
DATED : May 15, 2012
INVENTOR(S) : Kevin Chauvin et al.

It is certified that error appears in the above-identified patent and that said Letters Patent is hereby corrected as shown below:

On the title page, Item (73), the Assignee's name is incorrect. Item (73) should read:

-- (73) Assignee: Aisin Technical Center of America, Inc., Plymouth, MI (US) --

Signed and Sealed this
Tenth Day of July, 2012

David J. Kappos
*Director of the United States Patent and Trademark Office*